US012739398B2

(12) United States Patent
Liu et al.

(10) Patent No.: US 12,739,398 B2
(45) Date of Patent: Sep. 15, 2026

(54) DECODING METHOD AND APPARATUS, CODING METHOD AND APPARATUS, AND DEVICES

(71) Applicant: HANGZHOU HIKVISION DIGITAL TECHNOLOGY CO., LTD., Hangzhou (CN)

(72) Inventors: Yunzhuo Liu, Hangzhou (CN); Fangdong Chen, Hangzhou (CN); Li Wang, Hangzhou (CN); Xiaoyang Wu, Hangzhou (CN)

(73) Assignee: HANGZHOU HIKVISION DIGITAL TECHNOLOGY CO., LTD., Hangzhou (CN)

( * ) Notice: Subject to any disclaimer, the term of this patent is extended or adjusted under 35 U.S.C. 154(b) by 0 days.

(21) Appl. No.: 19/476,412

(22) PCT Filed: Apr. 17, 2024

(86) PCT No.: PCT/CN2024/088327
§ 371 (c)(1),
(2) Date: Oct. 17, 2025

(87) PCT Pub. No.: WO2024/217460
PCT Pub. Date: Oct. 24, 2024

(65) Prior Publication Data

US 2026/0122245 A1 Apr. 30, 2026

(30) Foreign Application Priority Data

Apr. 20, 2023 (CN) ......................... 202310445159.3

(51) Int. Cl.
*H04N 19/196* (2014.01)
*H04N 19/14* (2014.01)
*H04N 19/176* (2014.01)

(52) U.S. Cl.
CPC ........... *H04N 19/14* (2014.11); *H04N 19/176* (2014.11); *H04N 19/196* (2014.11)

(58) Field of Classification Search
CPC .... H04N 19/14; H04N 19/176; H04N 19/196; H04N 19/42; H04N 19/147; H04N 19/136; H04N 19/40
See application file for complete search history.

(56) References Cited

U.S. PATENT DOCUMENTS 12,532,009 B2 * 1/2026 Ikonin .................... H04N 19/42
2021/0067808 A1 * 3/2021 Schroers ............... G06V 10/82
(Continued)

FOREIGN PATENT DOCUMENTS

CN 110913220 A * 3/2020 ............ H04N 19/61
CN 110999304 A 4/2020
(Continued)

OTHER PUBLICATIONS

Hu et al., "Learning End-to-End Lossy Image Compression: A Benchmark," IEEE Transactions on Pattern Analysis and Machine Intelligence, Aug. 2022 (Year: 2022).*
(Continued)

*Primary Examiner* — Dramos Kalapodas
(74) *Attorney, Agent, or Firm* — Fish & Richardson P.C.

(57) ABSTRACT

Provided in the present application are a decoding method and apparatus, a coding method and apparatus, and devices. The decoding method comprises: decoding a code stream corresponding to the current image block, so as to obtain a coefficient hyper-parameter feature corresponding to the current image block; determining a probability distribution parameter on the basis of the coefficient hyper-parameter feature; on the basis of the probability distribution parameter, decoding a code stream corresponding to the current image block, so as to obtain an initial reconstruction feature
(Continued)

corresponding to the current image block; and on the basis of the initial reconstruction feature, determining a target reconstructed image block corresponding to the current image block. By means of the technical solution of the present application, the coding performance and the decoding performance can be improved.

16 Claims, 7 Drawing Sheets

(56) References Cited

U.S. PATENT DOCUMENTS

| | | | | |
|---|---|---|---|---|
| 2022/0103839 | A1 * | 3/2022 | Van Rozendaal | H04N 19/184 |
| 2022/0277491 | A1 * | 9/2022 | Lee | G06N 20/00 |
| 2022/0286696 | A1 * | 9/2022 | Gao | H04N 19/147 |

FOREIGN PATENT DOCUMENTS

| | | | | | |
|---|---|---|---|---|---|
| CN | 113347422 | A | | 9/2021 | |
| CN | 114026856 | A | | 2/2022 | |
| CN | 114386595 | A | * | 4/2022 | G06N 3/045 |
| CN | 114615500 | A | | 6/2022 | |
| CN | 115118972 | A | | 9/2022 | |
| CN | 115346089 | A | | 11/2022 | |
| EP | 3582142 | A1 | | 12/2019 | |
| JP | 2014072720 | A | * | 4/2014 | H04N 19/42 |
| TW | 202228081 | A | | 7/2022 | |
| TW | 202234890 | A | | 9/2022 | |
| WO | WO-2019238976 | A1 | * | 12/2019 | G06V 10/454 |
| WO | WO 2022106014 | A1 | | 5/2022 | |

OTHER PUBLICATIONS

International Search Report in International Appln. No. PCT/CN2024/088327, mailed on Jul. 16, 2024, 4 pages (with English translation).

Office Action in Chinese Appln. No. 2024113811164, mailed on Aug. 9, 2025, 15 pages (with English translation).

Hu et al., "Learning End-to-End Lossy Image Compression: A Benchmark," IEEE Transactions on Pattern Analysis and Machine Intelligence, Aug. 2022, 44(8), 18 pages.

Office Action in Korean Appln. No. 10-2025-7038761, mailed on Mar. 19, 2026, 10 pages (with English translation).

* cited by examiner

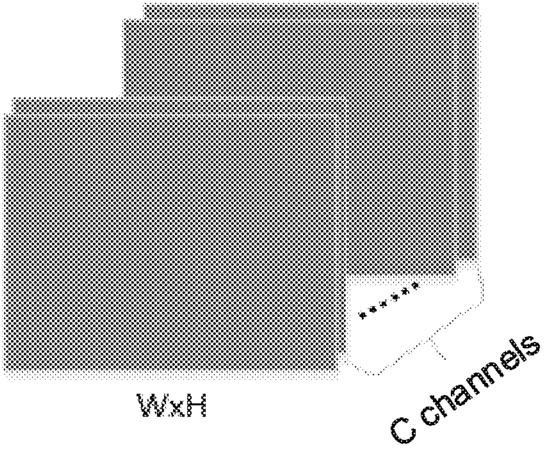

FIG. 1

Decode a first bitstream corresponding to the current picture block to obtain a coefficient hyperparameter feature corresponding to the current picture block — 201

↓

Determine a probability distribution parameter based on the coefficient hyperparameter feature; and based on the probability distribution parameter, decode a second bitstream corresponding to the current picture block to obtain an initial reconstructed feature of the current picture block — 202

↓

Decode a third bitstream corresponding to the current picture block to obtain an enhancement parameter corresponding to the current picture block — 203

↓

Enhance the initial reconstructed feature based on the enhancement parameter and the probability distribution parameter to obtain the enhanced reconstructed feature, and determine the target reconstructed picture block corresponding to the current picture block based on the enhanced reconstructed feature — 204

FIG. 2

DECODING METHOD AND APPARATUS, CODING METHOD AND APPARATUS, AND DEVICES

TECHNICAL FIELD

The present disclosure relates to the field of encoding and decoding technology, particularly to encoding and decoding methods and apparatuses, and devices thereof.

BACKGROUND

To save space, video pictures are encoded before transmission. A complete video encoding method can include prediction, transform, quantization, entropy encoding, filtering, and other processes. The prediction can include intra prediction and inter prediction. Inter prediction utilizes a temporal correlation of a video to predict pixels of a picture of a current frame by pixels of an adjacent encoded picture, to remove temporal redundancy in the video. Intra prediction utilizes a spatial correlation of a video to predict a current pixel using pixels of encoded blocks in a picture of a current frame, to remove spatial redundancy in the video.

With the rapid development of deep learning, deep learning has achieved success in many high-level computer vision problems, such as picture classification, object detection, etc. Deep learning is also gradually being applied in the field of encoding and decoding, that is, a neural network can be used to encode and decode pictures. Although encoding and decoding methods based on neural networks have shown great performance potential, the encoding and decoding methods based on neural networks still suffer from issues such as poor encoding performance, poor decoding performance, and high complexity.

SUMMARY

The present disclosure provides decoding and encoding methods and apparatuses, and devices.

The present disclosure provides a decoding method applied to the decoder, including: decoding the bitstream corresponding to the current picture block to obtain the coefficient hyperparameter feature corresponding to the current picture block; determining the probability distribution parameter based on the coefficient hyperparameter feature; based on the probability distribution parameter, decoding the bitstream corresponding to the current picture block to obtain the initial reconstructed feature of the current picture block; and based on the initial reconstructed feature, determining the target reconstructed picture block corresponding to the current picture block.

The present disclosure provides an encoding method applied to the encoder, including: encoding a coefficient hyperparameter feature corresponding to a current picture block to obtain a first bitstream corresponding to the current picture block; determining a probability distribution parameter based on the coefficient hyperparameter feature; encoding an initial picture feature corresponding to the current picture block based on the probability distribution parameter, to obtain a second bitstream corresponding to the current picture block; and encoding an important to obtain a third bitstream corresponding to the current picture block.

The present application provides a decoding device applied to a decoder, including: a decoding module for decoding the bitstream corresponding to the current picture block, to obtain the coefficient hyperparameter feature corresponding to the current picture block; determining probability distribution parameter based on the coefficient hyperparameter feature, decoding the bitstream corresponding to the current picture block based on the probability distribution parameter, to obtain the initial reconstructed feature corresponding to the current picture block; and a determining module for determining the target reconstructed picture block corresponding to the current picture block based on the initial reconstructed feature.

The present application provides an encoding device applied to the encoder, including: an encoding module, configured to encode a coefficient hyperparameter feature corresponding to a current picture block to obtain a first bitstream corresponding to the current picture block; determine a probability distribution parameter based on the coefficient hyperparameter feature; encode an initial picture feature corresponding to the current picture block based on the probability distribution parameter, to obtain a second bitstream corresponding to the current picture block; and encode an important channel identifier to obtain a third bitstream corresponding to the current picture block.

The present disclosure provides a decoding device including one or more processors and one or more machine-readable storage media, where the one or more machine-readable storage media store a machine executable instruction that can be executed by the one or more processors; and the one or more processors are configured to execute the machine executable instruction to implement the decoding method according to the above embodiment.

The present disclosure provides an encoding device including one or more processors and one or more machine-readable storage media, where the one or more machine-readable storage media store a machine executable instruction that can be executed by the one or more processors; and the one or more processors are configured to execute the machine executable instruction to implement the encoding method according to the above embodiment.

The present disclosure provides an electronic device including one or more processors and one or more machine-readable storage media, where the one or more machine-readable storage media store a machine executable instruction that can be executed by the one or more processors; and the one or more processors are configured to execute the machine executable instruction to implement the decoding method according to the above embodiment, or the encoding method according to the above embodiment.

The present disclosure provides a machine-readable storage medium, which stores several computer instructions. When the computer instructions are executed by a processor, the decoding method described above or the encoding method mentioned above is implemented.

The present disclosure provides a computer application program that, when executed by a processor, implements the decoding method described above, or implements the encoding method mentioned above.

BRIEF DESCRIPTION OF DRAWINGS

FIG. 1 is a schematic diagram of a three-dimensional feature matrix according to an embodiment of the present disclosure.

FIG. 2 is a flowchart of a decoding method according to an embodiment of the present disclosure.

DETAILED DESCRIPTION

Figure 3:
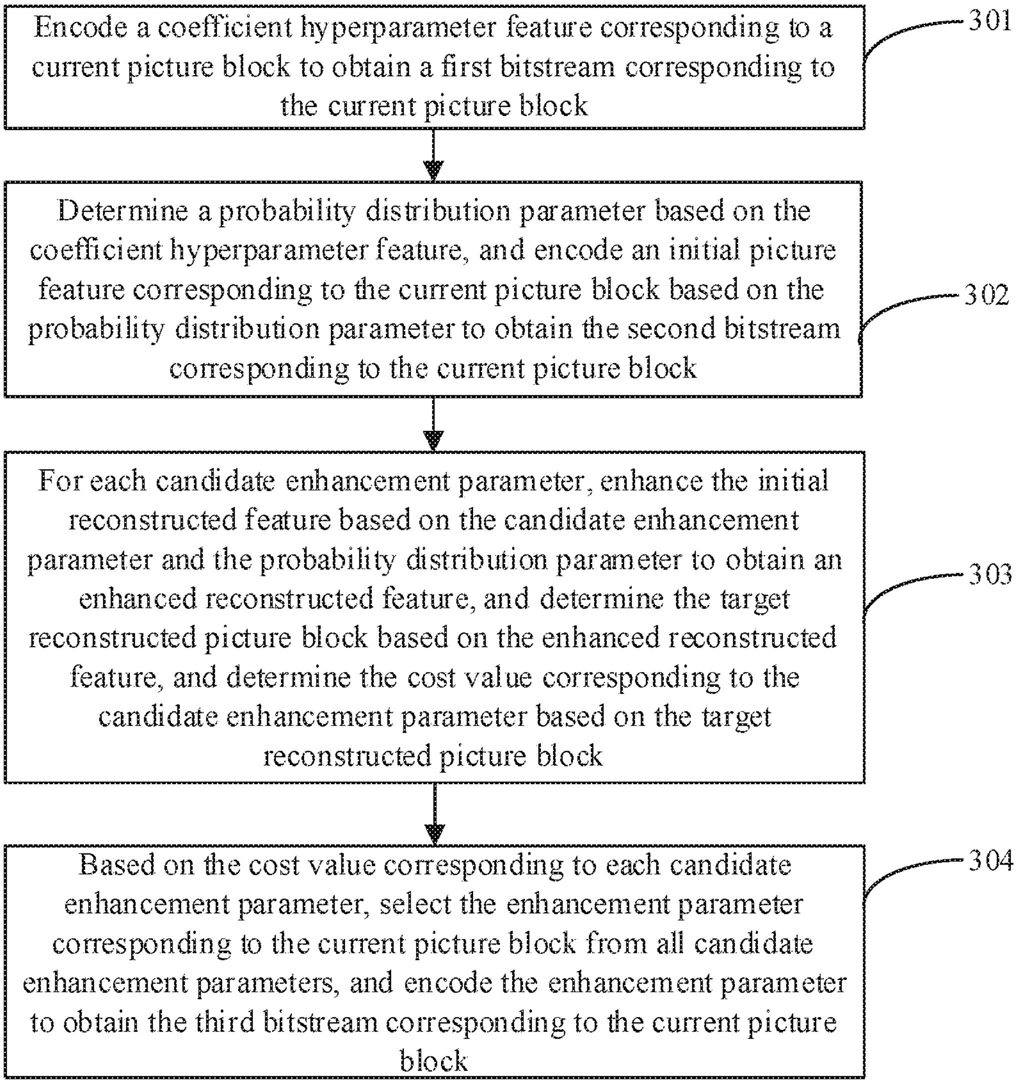
FIG. 3 is a flowchart of an encoding method according to an embodiment of the present disclosure.

The terms used in the embodiments of the present disclosure are only for the purpose of describing specific embodiments and are not intended to limit the present disclosure. As used in the present disclosure and claims, the singular forms "a", "said", and "the" are intended to include the plural forms as well, unless the context clearly indicates otherwise. It should also be understood that the term "and/or" used in this article refers to any or all possible combinations that include one or more associated listed items. It shall be understood that, although the terms "first," "second," "third," and the like may be used herein to describe various information, the information should not be limited by these terms. These terms are only used to distinguish the same type of information from each other. For example, without departing from the scope of the present disclosure, first information may be referred as second information; and similarly, second information may also be referred as first information. Depending on the context, the word "if" as used herein can be interpreted as "at the time of", "when" or "in response to determining".

Embodiments of the present disclosure propose a decoding method and an encoding method, which may involve the following concepts: Entropy Encoding, Neural Network (NN), Convolutional Neural Network (CNN), Deconvolutional layer, Generalization Ability, Features, Rate-Distortion Optimized (RDO) principle.

Entropy encoding refers to the encoding process that follows the principle of entropy without losing any information, where information entropy is the average amount of information (a measure of uncertainty) of the source. Entropy encoding methods can include but are not limited to: Shannon encoding, Huffman encoding, and arithmetic coding.

The neural network refers to an artificial neural network. The neural network is an operational model composed of a large number of interconnected nodes (or neurons). In the neural network, neuron processing units can represent different objects, such as features, letters, concepts, or some meaningful abstract patterns. The types of processing units in neural networks can be divided into three categories: input units, output units, and hidden units. The input units receive signals and data from the outside. The output units realize the output of processing results. The hidden units are located between the input units and the output units and cannot be observed from outside the system. The connection weight between neurons reflect the strength of the connection between units, and the representation and processing of information are reflected in the connection relationships between processing units. The neural network is a non programmed, brain like information processing method that essentially obtains a parallel distributed information processing function through the transform and dynamic behavior of the neural network, and imitates the information processing function of the nervous system of the human brain to different degrees and levels. In the field of video processing, a commonly used neural network can include but is not limited to: a Convolutional Neural Network (CNN), a Recurrent Neural Network (RNN), or a Fully Connected Network, etc.

The convolutional neural network is a type of feedforward neural network and is one of the most representative network structures in deep learning technology. The artificial neurons of Convolutional Neural Network can respond to surrounding units within a certain coverage area, and have excellent performance in large-scale image processing. The basic structure of a convolutional neural network consists of two layers: a feature extraction layer (also referred to as a convolutional layer) and a feature mapping layer (also referred to as an activation layer). For the feature extraction layer, the input of each neuron is connected to a local receptive field of the previous layer and extracts the local features. Once the local features are extracted, a positional relationship between the partial features and other features is also determined. For the feature mapping layer, each computational layer of the neural network consists of multiple feature maps. Each feature map is a plane, and the weights of all neurons on the plane are equal. The feature mapping structure can use Sigmoid function, ReLU function, Leaky-ReLU function, PReLU function, or GDN function, etc. as the activation function for the convolutional neural network. In addition, since neurons on one mapping surface share a weight, the number of free parameters in the network is reduced.

For example, one of the advantages of the convolutional neural network over image processing algorithms is that it avoids the complex pre-processing process (such as extracting artificial features) of the pictures, and can directly input the original picture for end-to-end learning. One of the advantages of the convolutional neural network compared to ordinary neural networks is that ordinary neural networks adopt a full connection approach, where all neurons from the input layer to the hidden layer are connected, which results in a huge number of parameters, makes network training time-consuming or even difficult. The Convolutional neural network can avoid this difficulty through local connections, weight sharing, and other approaches.

The deconvolutional layer is also referred to as transposed convolutional layer, and works similarly to the convolutional layer. The main difference is that the deconvolutional layer uses padding to make the output greater than the input (although the output and the input can also be kept the same). If the stride is 1, it means that the output size is equal to the input size. If the stride is N, it means that the width of the output feature is N times the width of the input feature, and the height of the output feature is N times the height of the input feature.

Generalization Ability: the generalization ability can refer to the adaptability of a machine learning algorithm to fresh samples. The purpose of learning is to learn the hidden patterns behind data pairs. For data outside the learning set that has the same pattern, the trained network can further provide appropriate outputs. This ability can be called generalization ability.

The feature involved in the present disclosure is a tensor or a three-dimensional feature matrix of C*W*H. As shown in FIG. 1, which is a schematic diagram of a three-dimensional feature matrix. In the three-dimensional feature matrix, C represents the number of channels, H represents the feature height, and W represents the feature width. The three-dimensional feature matrix can be the input or output of a neural network.

There are two major indicators for evaluating coding efficiency: bitrate and PSNR (Peak Signal to Noise Ratio). The smaller the bitstream, the higher the compression ratio; and the higher the PSNR, the better the reconstructed picture quality. In mode selection, the decision formula is essentially a comprehensive evaluation of the both. For example, the cost corresponding to a mode can be expressed as:

$$J(\text{mode}) = D + \lambda * R$$

Where D represents distortion, which can usually be measured using the SSE (Sum of Squared Errors) index. SSE refers to the mean square sum of the differences between the reconstructed picture block and the source picture. To realize cost consideration, the SAD (Sum of Absolute Differences) index can also be used, where the SAD refers to the sum of the absolute differences between the reconstructed picture block and the source picture. λ represents the Lagrange multiplier, and R represents the actual number of bits required for picture block encoding in this mode, including the total number of bits required for encoding mode information, motion information, and residuals, etc. When selecting modes, using the Rate-Distortion Optimization to compare and make decisions on encoding modes can usually ensure the best encoding performance.

There are many encoding tools proposed for each module of the encoder, and each tool usually has multiple modes. For different video sequences, the encoding tools that can achieve optimal encoding performance are often different. Therefore, in the encoding process, Rate-Distortion Optimization (RDO) is usually used to compare the encoding performance of different tools or modes to select the best tool or mode. After determining the optimal tool or mode, the decision information of the tool or mode is transmitted by encoding flag information in the bitstream. Although this approach brings high encoding complexity, it can adaptively select the optimal mode combination for different contents and achieve the best encoding performance. The decoder can obtain relevant mode information by directly parsing the flag information, with minimal complexity impact for decoding.

The general framework of end-to-end image encoding mainly includes the feature primary information part and the hyperprior side information part. The feature primary information part includes analysis network, quantization, Gaussian entropy encoding, Gaussian entropy decoding and synthesis network, and the hyperprior side information part includes hyperprior analysis network, quantization, factorized entropy encoding, factorized entropy decoding, and hyperprior synthesis network. The picture components are compressed, encoded, and reconstructed separately in the analysis network and synthesis network of the feature primary information part. The hyperprior side information part is mainly used to model the probability of the feature primary information and guide the entropy encoding and decoding of feature primary information. In the universal end-to-end image coding framework, there is a problem of insufficient utilization of the hyperprior side information, and thus the improvement of the quality of reconstructed image is limited.

In view of this, in the embodiments of the present disclosure, the characteristics of the end-to-end image encoding framework are utilized, and the decoder uses the probability distribution parameter to enhance the quality of features and improve the quality of reconstructed pictures. The encoder does not directly change the primary information, but encodes the enhancement parameter into the header information bitstream (third bitstream), and the decoder enhances the features of the primary information through the enhancement parameter.

The following provides a detailed explanation of the decoding and encoding methods in the embodiments of the present disclosure, based on several embodiments.

Embodiment 1: a decoding method is proposed in the embodiments of the present disclosure, as shown in FIG. 2, which is a flowchart of the method. The method can be applied to the decoding device (also referred to as the video decoder), and can include steps 201 to 204.

In step 201, a first bitstream corresponding to the current picture block is decoded to obtain a coefficient hyperparameter feature corresponding to the current picture block.

In step 202, a probability distribution parameter is determined based on the coefficient hyperparameter feature; and based on the probability distribution parameter, a second bitstream corresponding to the current picture block is decoded to obtain an initial reconstructed feature of the current picture block.

In step 203, a third bitstream corresponding to the current picture block is decoded to obtain an enhancement parameter corresponding to the current picture block, where the third bitstream can also be referred to as the header information bitstream corresponding to the current picture block.

In step 204, the initial reconstructed feature is enhanced based on the enhancement parameter and the probability distribution parameter to obtain the enhanced reconstructed feature, and the target reconstructed picture block corresponding to the current picture block is determined based on the enhanced reconstructed feature.

For example, the enhanced parameter includes an important channel identifier. The initial reconstructed feature includes C feature channel maps. The probability distribution parameter includes C probability distribution channel maps, where the C probability distribution channel maps respectively correspond to the C feature channel maps. The feature channel map corresponding to the important channel identifier is selected from the C feature channel maps as the important feature channel map, and the remaining feature channel maps are selected as non-important feature channel maps. The probability distribution channel map corresponding to the important feature channel map is selected as the important probability distribution channel map, and the probability distribution channel maps corresponding to the non-important feature channel maps are selected as the non-important probability distribution channel maps.

For example, the initial reconstructed feature may include C feature channel maps, and the probability distribution parameter may include C probability distribution channel maps, where the C probability distribution channel maps respectively correspond to the C feature channel maps. Based on this, for each feature channel map, the number of consumed bits for the feature channel map can be determined based on the feature values in the feature channel map and the probability distribution values in the probability distribution channel map corresponding to the feature channel map; and based on the number of consumed bits for each feature channel map, the important feature channel map is selected from C feature channel maps, and the remaining feature channel maps are selected as non-important feature channel maps; and the probability distribution channel map corresponding to the important feature channel map is selected as the important probability distribution channel map, and the probability distribution channel maps corresponding to the non-important feature channel maps are selected as the non-important probability distribution channel maps.

For example, the initial reconstructed feature may include the important feature channel map and the non-important feature channel map, and the probability distribution parameter may include the important probability distribution channel map corresponding to the important feature channel map and the non-important probability distribution channel map corresponding to the non-important feature channel map. Based on the enhancement parameter and the probability distribution parameter, enhancing the initial reconstructed feature to obtain the enhanced reconstructed feature may include but are not limited to: performing feature adaptive edge enhancement on the important feature channel map based on the feature domain enhancement parameter and the important probability distribution channel map to obtain the first reconstructed feature after the feature adaptive edge enhancement; based on the feature domain enhancement parameter and the non-important probability distribution channel map, performing feature adaptive scaling on the non-important feature channel map to obtain the second reconstructed feature after the feature adaptive scaling; and generating the enhanced reconstructed feature based on the first reconstructed feature and second reconstructed feature.

For example, the feature domain enhancement parameter may include multiple edge enhancement segment magnitude values and multiple edge enhancement segment thresholds. Multiple edge enhancement segment thresholds may form multiple edge enhancement threshold intervals, and the multiple edge enhancement threshold intervals respectively correspond to the multiple edge enhancement segment magnitude values. On this basis, based on the feature domain enhancement parameter and the important probability distribution channel map, performing feature adaptive edge enhancement on the important feature channel map to obtain the first reconstructed feature after feature adaptive edge enhancement may include but is not limited to: when the important probability distribution channel map includes multiple probability distribution values, for each probability distribution value, the edge enhancement segment magnitude value corresponding to the probability distribution value can be determined based on the edge enhancement threshold interval corresponding to the probability distribution value; and based on the edge enhancement segment magnitude value corresponding to each probability distribution value, performing feature adaptive edge enhancement on the important feature channel map to obtain the first reconstructed feature after feature adaptive edge enhancement.

For example, based on the edge enhancement segment magnitude value corresponding to each probability distribution value, performing feature adaptive edge enhancement on the important feature channel map to obtain the first reconstructed feature after feature adaptive edge enhancement may include but is not limited to: normalizing the important feature channel map to obtain a normalized feature map; generating a high-frequency detail picture based on the important feature channel map and the normalized feature map; for each feature value in high-frequency detail picture, based on the edge enhancement segment magnitude value corresponding to the probability distribution value corresponding to the feature value, performing edge enhancement on the feature value to obtain the edge enhanced feature value; determining the edge enhanced feature map based on the edge enhanced feature value corresponding to each feature value; and performing inverse normalization on the edge enhanced feature map to obtain the first reconstructed feature.

For example, the feature domain enhancement parameter may include a scaling parameter value. Based on the feature domain enhancement parameter and the non-important probability distribution channel map, performing feature adaptive scaling on the non-important feature channel map to obtain the second reconstructed feature after feature adaptive scaling may include but is not limited to: when the non-important feature channel map includes multiple feature values, and the non-important probability distribution channel map includes multiple probability distribution values, for each feature value in the non-important feature channel map, determining the scaled feature value corresponding to the feature value based on the feature value, the scaling parameter value, and the probability distribution value corresponding to the feature value; and based on the scaled feature value corresponding to each feature value in the non-important feature channel map, determining the second reconstructed feature.

For example, determining the target reconstructed picture block corresponding to the current picture block based on enhanced reconstructed feature can include but is not limited to: inputting the enhanced reconstructed feature into a synthesis transform network to obtain the target reconstructed picture block corresponding to the current picture block; or inputting the enhanced reconstructed feature into a synthesis transform network to obtain the initial reconstructed picture block corresponding to the current picture block; and based on the probability distribution parameter and the picture domain enhancement parameter corresponding to the current picture block, performing picture adaptive edge enhancement on the initial reconstructed picture block to obtain the target reconstructed picture block corresponding to the current picture block; where the picture domain enhancement parameter are obtained by decoding the third bitstream corresponding to the current picture block, i.e., decoding the third bitstream to obtain the picture domain enhancement parameter corresponding to the current picture block.

For example, the picture domain enhancement parameter may include multiple picture enhancement segment magnitude values and multiple picture enhancement segment thresholds. Multiple picture enhancement segment thresholds may form multiple picture enhancement threshold intervals, and the multiple picture enhancement threshold intervals respectively correspond to the multiple picture enhancement segment magnitude values. Based on this, performing picture adaptive edge enhancement on the initial reconstructed picture block based on the probability distribution parameter and the picture domain enhancement parameter corresponding to the current picture block, to obtain the target reconstructed picture block corresponding to the current picture block can include but is not limited to: obtaining the target probability distribution channel map based on the probability distribution parameter; when the target probability distribution channel map includes multiple probability distribution values, for each probability distribution value, determining the picture enhancement segment magnitude value corresponding to the probability distribution value based on the picture enhancement threshold interval corresponding to that probability distribution value; and based on the picture enhancement segment magnitude value corresponding to each probability distribution value, performing picture adaptive edge enhancement on the initial reconstructed picture block to obtain the target reconstructed picture block corresponding to the current picture block.

For example, obtaining the target probability distribution channel map based on the probability distribution parameter can include but is not limited to: if the probability distribution parameter includes an important probability distribution channel map and a non-important probability distribution channel map, upsampling the important probability distribution channel map to obtain the target probability distribution channel map; where the size of the target probability distribution channel map is the same as the size of the initial reconstructed picture block.

For example, based on the picture enhancement segment magnitude value corresponding to each probability distribution value, performing picture adaptive edge enhancement on the initial reconstructed picture block to obtain the target reconstructed picture block corresponding to the current picture block may include but is not limited to: generating a high-frequency detail picture based on the initial reconstructed picture block; for each feature value in the high-frequency detail picture, based on the picture enhancement segment magnitude value corresponding to the probability distribution value corresponding to the feature value, performing edge enhancement on the feature value, to obtain the picture enhanced feature value; and determining the target reconstructed picture block based on the picture enhanced feature value corresponding to each feature value in the high-frequency detail picture.

For example, enhancing the initial reconstructed feature based on the enhancement parameter and probability distribution parameter to obtain enhanced reconstructed feature may include but is not limited to: enhancing an initial reconstructed feature corresponding to the luma component of the current picture block based on the feature domain enhancement parameter and the probability distribution parameter to obtain the enhanced reconstructed feature corresponding to the luma component. Based on the probability distribution parameter and the picture domain enhancement parameter corresponding to the current picture block, performing picture adaptive edge enhancement on the initial reconstructed picture block to obtain the target reconstructed picture block corresponding to the current picture block may include but is not limited to: performing picture adaptive edge enhancement on the initial reconstructed picture block corresponding to the luma component of the current picture block based on the picture domain enhancement parameter and probability distribution parameter to obtain the target reconstructed picture block corresponding to the luma component; and based on picture domain enhancement parameter and probability distribution parameter, performing picture adaptive edge enhancement on the initial reconstructed picture block corresponding to the chroma component of the current picture block to obtain the target reconstructed picture block corresponding to the chroma component.

For example, the initial reconstructed feature includes multiple feature channel maps, the probability distribution parameter includes multiple probability distribution channel maps, the multiple probability distribution channel maps respectively correspond to the multiple feature channel maps, and the method further includes: decoding a bitstream corresponding to the current picture block to obtain an important channel identifier; based on the important channel identifier, selecting the feature channel map corresponding to the important channel identifier from the multiple feature channel maps as the important feature channel map, and selecting the remaining feature channel maps as non-important feature channel maps; and selecting the probability distribution channel map corresponding to the important feature channel map as the important probability distribution channel map, and selecting the probability distribution channel maps corresponding to the non-important feature channel maps as the non-important probability distribution channel maps.

For example, the initial reconstructed feature includes multiple feature channel maps, the probability distribution parameter includes multiple probability distribution channel maps, the multiple probability distribution channel maps respectively correspond to the multiple feature channel maps, and the method further includes: for each feature channel map, based on the feature values in the feature channel map and the probability distribution values in the probability distribution channel map corresponding to the feature channel map, determining the number of consumed bits for the feature channel map; based on the number of consumed bits for each feature channel map, selecting an important feature channel map from the multiple feature channel maps, and selecting the remaining feature channel maps as non-important feature channel maps; and selecting the probability distribution channel map corresponding to the important feature channel map as the important probability distribution channel map, and selecting the probability distribution channel maps corresponding to the non-important feature channel maps as the non-important probability distribution channel maps.

For example, by decoding the first bitstream corresponding to the current picture block, the coefficient hyperparameter feature and probability distribution parameter corresponding to the current picture block are obtained; by decoding the second bitstream corresponding to the current picture block, the initial reconstructed feature corresponding to the current picture block is obtained; and by decoding the third bitstream corresponding to the current picture block, the important channel identifier is obtained; where the first bitstream, the second bitstream, and the third bitstream are bitstreams encoding different information.

For example, the above execution order is only for the convenience of describing the given examples. In practical applications, the execution order of steps can also be changed without limitation. Moreover, in other embodiments, the steps of the corresponding method can not necessarily be executed in the order shown and described in the specification, and the steps included in the method can be more or less than those described in the specification. In addition, the single step described in the specification can be decomposed into multiple steps for description in other embodiments. The multiple steps described in the specification can also be combined into a single step for description in other embodiments.

From the above technical solutions, it can be seen that in the embodiments of the present disclosure, after the initial reconstructed feature corresponding to the current picture block is obtained, the initial reconstructed feature can be enhanced based on the enhancement parameter and the probability distribution parameter to obtain the enhanced reconstructed feature; and based on the enhanced reconstructed feature, the target reconstructed picture block corresponding to the current picture block can be determined. Thereby, an end-to-end video image compression method that can implement video image encoding and decoding based on a neural network is proposed, which can improve the encoding and decoding efficiency, by combining the enhancement parameter and the probability distribution parameter. Combining the network architecture design and the header information bitstream (such as the third bitstream) allows the neural network to maintain low complexity, and effectively ensure the quality of reconstructed picture blocks, which achieves the goal of improving encoding and decoding performance and reducing complexity. By using the enhancement parameter and the probability distribution parameter to enhance the quality of features, the encoder does not directly change the feature information, but encodes the enhancement parameter (such as important channel identifier) into the header information bitstream. The decoder enhances the features through the enhancement parameter, improves the encoding performance, and enhances the quality of the reconstructed picture.

Embodiment 2: an encoding method is proposed in the embodiments of the present disclosure, as shown in FIG. 3, which is a flowchart of the method. The method can be applied to an encoding device (also referred to as the video encoder), and can include steps 301 to 304.

In step 301, a coefficient hyperparameter feature corresponding to a current picture block is encoded to obtain a first bitstream corresponding to the current picture block.

In step 302, a probability distribution parameter is determined based on the coefficient hyperparameter feature, and an initial picture feature corresponding to the current picture block is encoded based on the probability distribution parameter to obtain the second bitstream corresponding to the current picture block.

In step 303, for each candidate enhancement parameter, the initial reconstructed feature is enhanced based on the candidate enhancement parameter and the probability distribution parameter to obtain an enhanced reconstructed feature, and the target reconstructed picture block is determined based on the enhanced reconstructed feature, and the cost value corresponding to the candidate enhancement parameter is determined based on the target reconstructed picture block.

In step 304, based on the cost value corresponding to each candidate enhancement parameter, the enhancement parameter corresponding to the current picture block is selected from all candidate enhancement parameters, and the enhancement parameter is encoded to obtain the third bitstream corresponding to the current picture block, where the third bitstream can also be referred to as the header information bitstream corresponding to the current picture block.

For example, the initial reconstructed feature includes the important feature channel map and the non-important feature channel map, and the probability distribution parameter includes the important probability distribution channel map corresponding to the important feature channel map and the non-important probability distribution channel map corresponding to the non-important feature channel map. Based on the candidate enhancement parameter and the probability distribution parameter, enhancing the initial reconstructed feature to obtain the enhanced reconstructed feature may include but are not limited to: performing feature adaptive edge enhancement on the important feature channel map based on the candidate feature domain enhancement parameter and the important probability distribution channel map to obtain the first reconstructed feature after the feature adaptive edge enhancement; based on the candidate feature domain enhancement parameter and the non-important probability distribution channel map, performing feature adaptive scaling on the non-important feature channel map to obtain the second reconstructed feature after the feature adaptive scaling; and generating the enhanced reconstructed feature based on the first reconstructed feature and second reconstructed feature.

For example, determining the target reconstructed picture block based on the enhanced reconstructed feature can include but is not limited to: inputting the enhanced reconstructed feature into a synthesis transform network to obtain the initial reconstructed picture block corresponding to the current picture block; for each candidate picture domain enhancement parameter, performing picture adaptive edge enhancement on the initial reconstructed picture block based on the candidate picture domain enhancement parameter and probability distribution parameter to obtain the target reconstructed picture block corresponding to the current picture block. On this basis, for each candidate picture domain enhancement parameter, the cost value corresponding to the candidate picture domain enhancement parameter can also be determined based on the target reconstructed picture block; based on the cost value corresponding to each candidate picture domain enhancement parameter, the picture domain enhancement parameter corresponding to the current picture block is selected from all candidate picture domain enhancement parameter, and the picture domain enhancement parameter is encoded to obtain the third bitstream corresponding to the current picture block.

For example, the processing procedure of the encoder is similar to that of the decoder, and the similarities will not be repeated. The processing procedure of the decoder can be applied to the encoder, that is, the encoder adopts the same processing method.

For example, the above execution order is only for the convenience of describing the given examples. In practical applications, the execution order of steps can also be changed without limitation. Moreover, in other embodiments, the steps of the corresponding method can not necessarily be executed in the order shown and described in the specification, and the steps included in the method can be more or less than those described in the specification. In addition, the single step described in the specification can be decomposed into multiple steps for description in other embodiments. The multiple steps described in the specification can also be combined into a single step for description in other embodiments.

From the above technical solutions, it can be seen that in the embodiments of the present disclosure, after the initial reconstructed feature corresponding to the current picture block is obtained, the initial reconstructed feature can be enhanced based on the enhancement parameter and the probability distribution parameter to obtain the enhanced reconstructed feature; and based on the enhanced reconstructed feature, the target reconstructed picture block corresponding to the current picture block can be determined. Thereby, an end-to-end video image compression method that can implement video image encoding and decoding based on a neural network is proposed, which can improve the encoding and decoding efficiency, by combining the enhancement parameter and the probability distribution parameter. Combining the network architecture design and the header information bitstream (such as the third bitstream) allows the neural network to maintain low complexity, and effectively ensure the quality of reconstructed picture blocks, which achieves the goal of improving encoding and decoding performance and reducing complexity. By using the enhancement parameter and the probability distribution parameter to enhance the quality of features, the encoder does not directly change the feature information, but encodes the enhancement parameter (such as important channel identifier) into the header information bitstream. The decoder enhances the features through the enhancement parameter, improves the encoding performance, and enhances the quality of the reconstructed picture.

Figure 4:
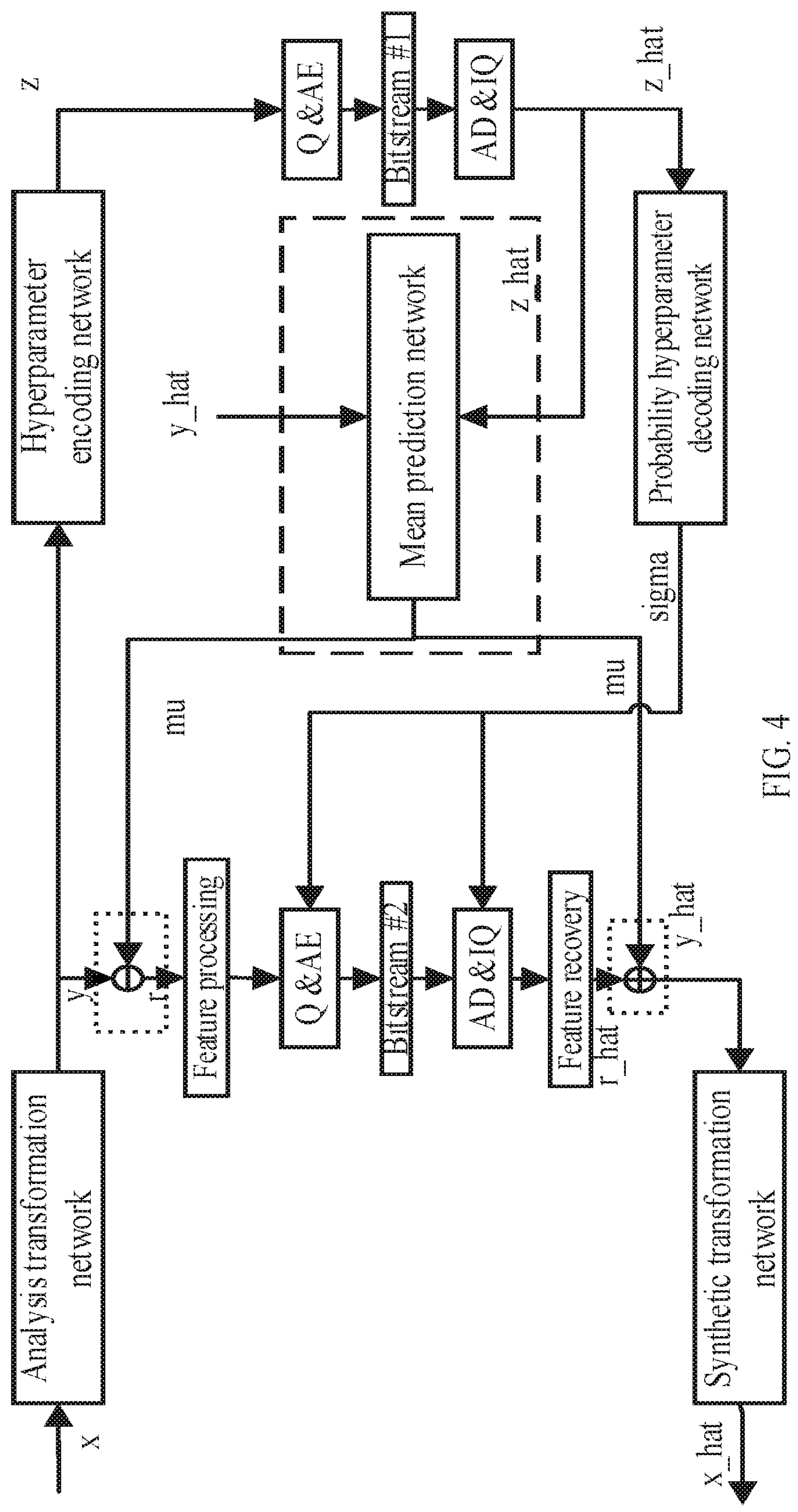
FIG. 4 is a schematic diagram of a processing procedure of an encoder according to an embodiment of the present disclosure.

Embodiment 3: for Embodiment 1 and Embodiment 2, the processing procedure of the encoder can be seen in FIG. 4. Of course, FIG. 4 is only an example of the processing procedure at the encoder, and does not limit the processing procedure at the encoder.

After obtaining the current picture block x (where the current picture block x can be the original picture block x, i.e., the input picture block), the encoder can analyze and transform the current picture block x through an analysis transform network (i.e., a neural network) to obtain the picture feature y corresponding to the current picture block x. Where performing analysis transform on the current picture block x by the analysis transform network refers to: transforming the current picture block x to a picture feature y in a latent domain, thereby facilitating all subsequent processes to operate in the latent domain.

Where the picture can be divided into one picture block or multiple picture blocks. If the picture is divided into one picture block, the current picture block x can also be a picture, which means that the encoding and decoding process for the picture block can be directly applied to the picture.

After obtaining the picture feature y, the encoder performs coefficient hyperparameter feature transform on the picture feature y to obtain the coefficient hyperparameter feature z. For example, the picture feature y can be input to a hyperparameter encoding network (i.e., a neural network), where the hyperparameter encoding network performs coefficient hyperparameter feature transform on the picture feature y to obtain the coefficient hyperparameter feature z. V/here the hyperparameter encoding network can be a trained neural network. The training process of the hyperparameter encoding network is not limited, as long as the trained hyperparameter encoding network can perform the coefficient hyperparameter feature transform on the picture feature y. Where the picture feature y in the latent domain is processed by a hyperparameter encoding network to obtain hyper prior latent information z.

After obtaining the coefficient hyperparameter feature z, the encoder can quantize the coefficient hyperparameter feature z to obtain the hyperparameter quantized feature corresponding to the coefficient hyperparameter feature z, where the Q operation in FIG. 4 represents the quantization process. After the hyperparameter quantized feature corresponding to the coefficient hyperparameter feature z is obtained, the hyperparameter quantized feature is encoded to obtain the Bitstream #1 (i.e., the first bitstream) corresponding to the current picture block. The AE operation in FIG. 4 represents the encoding process, such as entropy encoding. Alternatively, the encoder can directly encode the coefficient hyperparameter feature z to obtain the Bitstream #1 corresponding to the current picture block. Where the hyperparameter quantized feature or coefficient hyperparameter feature z carried in Bitstream #1 is mainly used to obtain the parameter of the mean and probability distribution model.

After obtaining the Bitstream #1 corresponding to the current picture block, the encoder can transmit the Bitstream #1 corresponding to the current picture block to the decoder. The processing procedure of the decoder for the Bitstream #1 corresponding to the current picture block is referred to the subsequent embodiments.

After obtaining the Bitstream #1 corresponding to the current picture block, the encoder can also decode Bitstream #1 to obtain hyperparameter quantization feature. AD in FIG. 4 represents the decoding process. Then, the hyperparameter quantized feature are inverse quantized to obtain the coefficient hyperparameter feature z_hat, where the coefficient hyperparameter feature z_hat can be the same or different from the coefficient hyperparameter feature z. The IQ operation in FIG. 4 represents the inverse quantization process. Alternatively, after obtaining the Bitstream #1 corresponding to the current picture block, the encoder can also decode Bitstream #1 to obtain the coefficient hyperparameter feature z_hat, without involving the inverse quantization process of the coefficient hyperparameter feature z_hat.

For the encoding process of Bitstream #1, an encoding method with a fixed probability density model can be used, and for the decoding process of Bitstream #1, a decoding method with a fixed probability density model can be used, which is not limited.

After obtaining the coefficient hyperparameter feature z_hat, the encoder can perform context-based prediction based on the coefficient hyperparameter feature z_hat of the current picture block and the reconstructed feature y_hat of the previous picture block (the determination process of the reconstructed feature y_hat is described in the subsequent embodiments), to obtain the predicted value mu (i.e., the mean mu) corresponding to the current picture block. For example, the coefficient hyperparameter feature z_hat and reconstructed feature y_hat are input to the mean prediction network, and the mean prediction network determines the predicted value mu based on the coefficient hyperparameter feature z_hat and reconstructed feature y_hat. This prediction process is not limited. Where for the context-based prediction process, the input includes the coefficient hyperparameter feature z_hat and the decoded reconstructed feature y_hat, where the initial coefficient hyperparameter feature z_hat and the decoded residual feature y_hat are jointly input to obtain a more accurate predicted value mu. The predicted value mu is used to subtract from the original feature to obtain the residual feature r, and the residual feature r is added to the decoded residual feature r_hat to obtain the reconstructed feature y_hat.

It should be noted that the mean prediction network is an optional neural network, which means there may be no mean prediction network. That is, there is no need to determine the predicted value mu through the mean prediction network. The dashed box in FIG. 4 indicates that the mean prediction network is optional.

After obtaining the picture feature y, the encoder can determine the residual feature r based on the picture feature y and the predicted value mu, such as taking the difference between the picture feature y and the predicted value mu as the residual feature r. Then, the residual feature r is subjected to feature processing to obtain the picture feature s. The feature processing process is not limited and can be any feature processing method. In this case, it is necessary to deploy a mean prediction network to provide the predicted value mu. Alternatively, after obtaining the picture feature y, the encoder can perform feature processing on the picture feature y to obtain the picture feature s. The feature processing process is not limited and can be any feature processing method. In this case, there is no need to deploy a mean prediction network, and the residual process is represented by a dashed box as an optional process.

After obtaining the picture feature s, the encoder can quantize the picture feature s to obtain the corresponding picture quantized feature. The Q operation in FIG. 4 represents the quantization process. After obtaining the picture quantized feature corresponding to the picture feature s, the encoder can encode the picture quantized feature to obtain the Bitstream #2 (i.e., the second bitstream) corresponding to the current picture block. The AE operation in FIG. 4 represents the encoding process, such as the entropy encoding process. Alternatively, the encoder can directly encode the picture feature s to obtain the Bitstream #2 corresponding to the current picture block, without involving the quantization process of the picture feature s.

After obtaining the Bitstream #2 corresponding to the current picture block, the encoder can transmit the Bitstream #2 corresponding to the current picture block to the decoder. The processing procedure of the decoder for the Bitstream #2 corresponding to the current picture block is referred to the subsequent embodiments.

After obtaining the Bitstream #2 corresponding to the current picture block, the encoder can also decode Bitstream #2 to obtain picture quantization feature. AD in FIG. 4 represents the decoding process. Then, the encoder can perform inverse quantization on the quantized feature of the picture to obtain the picture feature s', where the picture feature s' can be the same or different from the picture feature s. The IQ in FIG. 4 represents the inverse quantization. Alternatively, after obtaining the Bitstream #2 corresponding to the current picture block, the encoder can further decode Bitstream #2 to obtain picture feature s', without involving the inverse quantization process of picture quantized feature.

After obtaining the picture feature s', the encoder can perform feature restoration (i.e., the inverse process of the feature processing) on the picture feature s', to obtain the residual feature r_hat. There are no restrictions on this feature restoration process, and any feature restoration method can be used. The residual feature r_hat can be the same or different from the residual feature r. After obtaining the residual feature r_hat, the encoder determines the picture feature y_hat (i.e., the reconstructed feature) based on the residual feature r_hat and the predicted value mu. For example, the sum of the residual feature r_hat and the predicted value mu is taken as the picture feature y_hat, and the picture feature y_hat and the picture feature y can be the same or different. In this case, it is necessary to deploy a mean prediction network to provide the predicted value mu. Alternatively, after obtaining the picture feature s', the encoder can perform feature restoration (i.e., the inverse process of the feature processing) on the picture feature s' to obtain the picture feature y_hat, where the picture feature y_hat can be the same or different from the picture feature y. In this case, there is no need to deploy a mean prediction network, and the residual process is represented by a dashed box as an optional process.

After obtaining the picture feature y_hat, the encoder can perform a synthesis transform on the picture feature y_hat to obtain the reconstructed picture block x_hat corresponding to the current picture block x. For example, the picture feature y_hat is into a synthesis transform network, and the synthesis transform network performs a synthesis transform on the picture feature y_hat to obtain the reconstructed picture block x_hat. Thus, the picture reconstruction process is completed.

In an embodiment, when encoding the picture quantized feature or the picture feature s to obtain the Bitstream #2 corresponding to the current picture block, the encoder needs to first determine a probability distribution model, and then encode the picture quantized feature or picture feature s based on the probability distribution model. In addition, when decoding Bitstream #2. The encoder also needs to first determine the probability distribution model, and then decode Bitstream #2 based on the probability distribution model.

To obtain the probability distribution model, as shown in FIG. 4, the encoder can perform inverse coefficient hyperparameter feature transform on the coefficient hyperparameter feature z_hat after obtaining the coefficient hyperparameter feature z_hat, to obtain the probability distribution parameter. For example, the coefficient hyperparameter feature z_hat is inputted into a probabilistic hyperparameter decoding network, the network performs inverse coefficient hyperparameter feature transform on the coefficient hyperparameter feature z_hat to obtain the probability distribution parameter sigma. After the probability distribution parameter is obtained, a probability distribution model can be generated based on the probability distribution parameter. The probability hyperparameter decoding network can be a trained neural network. The training process of the probability hyperparameter decoding network is not limited, as long as the probability hyperparameter decoding network can perform inverse coefficient hyperparameter feature transform on the coefficient hyperparameter feature z_hat to obtain the probability distribution apparatus.

In an embodiment, the processing of the encoder described above is performed by a deep learning model or a neural network model, thereby achieving end-to-end picture compression and encoding processes, which is not limited.

Figure 5:
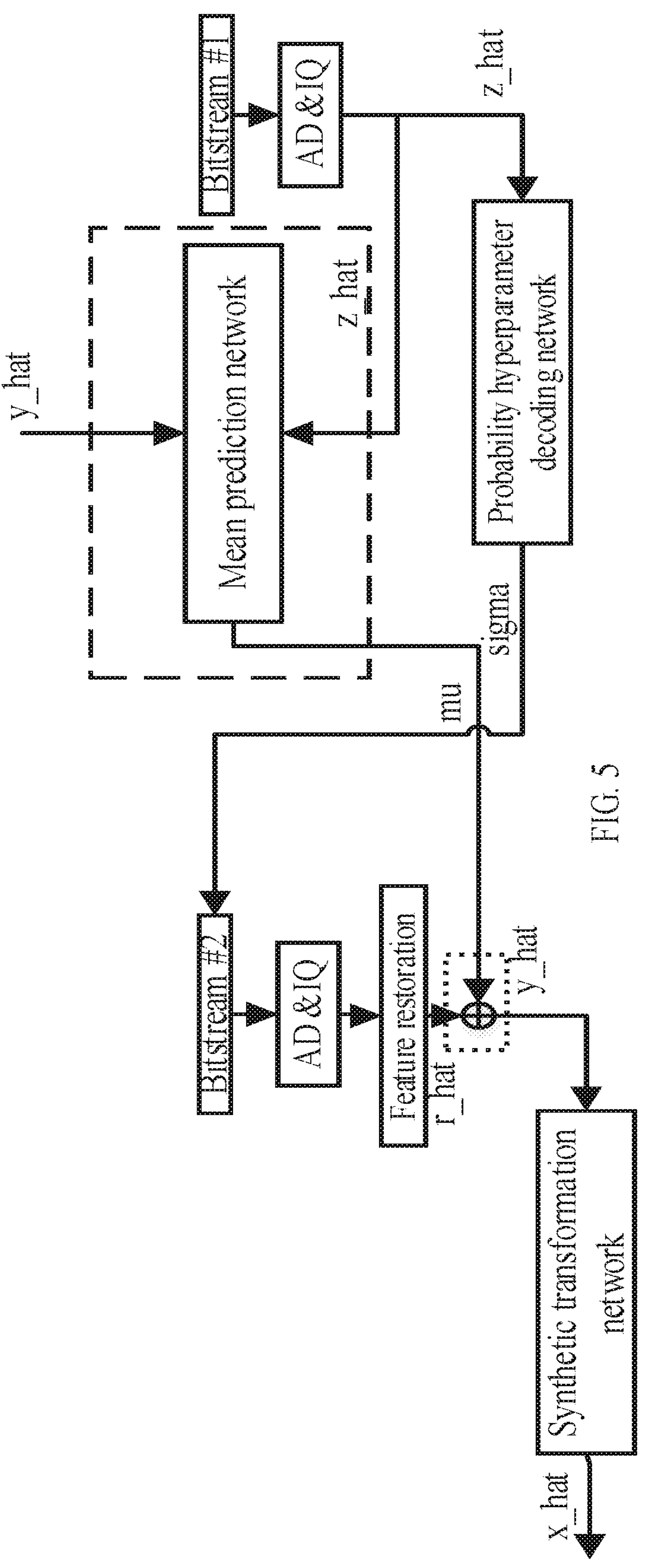
FIG. 5 is a schematic diagram of a processing procedure of a decoder according to an embodiment of the present disclosure.

Embodiment 4: for Embodiment 1 and Embodiment 2, the processing procedure of the decoder can be seen in FIG. 5. FIG. 5 is only an example of the processing procedure at the decoder, and does not limit the processing procedure at the decoder.

After obtaining the Bitstream #1 corresponding to the current picture block, the decoder can also decode Bitstream #1 to obtain hyperparameter quantization feature. AD in FIG. 5 represents the decoding process. Then, the decoder can perform inverse quantization on the hyperparameter quantized feature to obtain the coefficient hyperparameter feature z_hat, where the coefficient hyperparameter feature z_hat can be the same or different from the coefficient hyperparameter feature z. The IQ operation in FIG. 5 represents the inverse quantization process. Alternatively, after obtaining the Bitstream #1 corresponding to the current picture block, the decoder can also decode Bitstream #1 to obtain the coefficient hyperparameter feature z_hat, without involving the inverse quantization process of the coefficient hyperparameter feature z_hat.

For the decoding process of Bitstream #1, a decoding method with a fixed probability density model can be used, which is not limited.

A picture can be divided into one picture block or multiple picture blocks. If the picture is divided into one picture block, the current picture block x can also be a picture, which means that the decoding process for the picture block can be directly applied to the picture.

After obtaining the coefficient hyperparameter feature z_hat, the decoder can perform context-based prediction based on the coefficient hyperparameter feature z_hat of the current picture block and the reconstructed feature y_hat of the previous picture block (the determination process of the reconstructed feature y_hat is described in the subsequent embodiments), to obtain the predicted value mu (i.e., the mean mu) corresponding to the current picture block. For example, the coefficient hyperparameter feature z_hat and reconstructed feature y_hat are input to the mean prediction network, and the mean prediction network determines the predicted value mu based on the coefficient hyperparameter feature z_hat and reconstructed feature y_hat. This prediction process is not limited. Where for the context-based prediction process, the input includes the coefficient hyperparameter feature z_hat and the decoded reconstructed feature y_hat, where the initial coefficient hyperparameter feature z_hat and the decoded residual feature y_hat are jointly input to obtain a more accurate predicted value mu.

It should be noted that the mean prediction network is an optional neural network, which means there may be no mean prediction network. That is, there is no need to determine the predicted value mu through the mean prediction network. The dashed box in FIG. 5 indicates that the mean prediction network is optional.

After obtaining the Bitstream #2 corresponding to the current picture block, the decoder can decode Bitstream #2 to obtain picture quantization feature. AD in FIG. 5 represents the decoding process. Then, the decoder can perform inverse quantization on the quantized feature of the picture to obtain the picture feature s', where the picture feature s' can be the same or different from the picture feature s. The IQ in FIG. 5 represents the inverse quantization. Alternatively, after obtaining the Bitstream #2 corresponding to the current picture block, the decoder can further decode Bitstream #2 to obtain picture features s', without involving the inverse quantization process of picture quantized feature.

After obtaining the picture feature s', the decoder can perform feature restoration (i.e., the inverse process of the feature processing) on the picture feature s' to obtain the residual feature r_hat, where the residual feature r_hat is the same or different from the residual feature r. After obtaining the residual feature r_hat, the decoder determines the picture feature y_hat (i.e., the reconstructed feature) based on the residual feature r_hat and the predicted value mu. For example, the sum of the residual feature r_hat and the predicted value mu is taken as the picture feature y_hat, and the picture feature y_hat and the picture feature y can be the same or different. In this case, it is necessary to deploy a mean prediction network to provide the predicted value mu. Alternatively, after obtaining the picture feature s', the decoder can perform feature restoration on the picture feature s' to obtain the picture feature y_hat, where the picture feature y_hat can be the same or different from the picture feature y. In this case, there is no need to deploy a mean prediction network, and the residual process is represented by a dashed box as an optional process.

After obtaining the picture feature y_hat, the decoder can perform a synthesis transform on the picture feature y_hat to obtain the reconstructed picture block x_hat corresponding to the current picture block x. For example, the picture feature y_hat is into a synthesis transform network, and the synthesis transform network performs a synthesis transform on the picture feature y_hat to obtain the reconstructed picture block x_hat. Thus, the picture reconstruction process is completed.

In an embodiment, when decoding Bitstream #2. the decoder needs to first determine the probability distribution model, and then decode Bitstream #2 based on the probability distribution model. To obtain the probability distribution model, as shown in FIG. 5, the decoder can perform inverse coefficient hyperparameter feature transform on the coefficient hyperparameter feature z_hat after obtaining the coefficient hyperparameter feature z_hat, to obtain the probability distribution parameter. For example, the coefficient hyperparameter feature z_hat is inputted into a probabilistic hyperparameter decoding network, the network performs inverse coefficient hyperparameter feature transform on the coefficient hyperparameter feature z_hat to obtain the probability distribution parameter. After the probability distribution parameter is obtained, a probability distribution model can be generated based on the probability distribution parameter. The probability hyperparameter decoding network can be a trained neural network. The training process of the probability hyperparameter decoding network is not limited, as long as the probability hyperparameter decoding network can perform inverse coefficient hyperparameter feature transform on the coefficient hyperparameter feature z_hat to obtain the probability distribution apparatus.

In an embodiment, the processing of the decoder described above is performed by a deep learning model or a neural network model, thereby achieving end-to-end picture decoding processes, which is not limited.

Figure 6A:
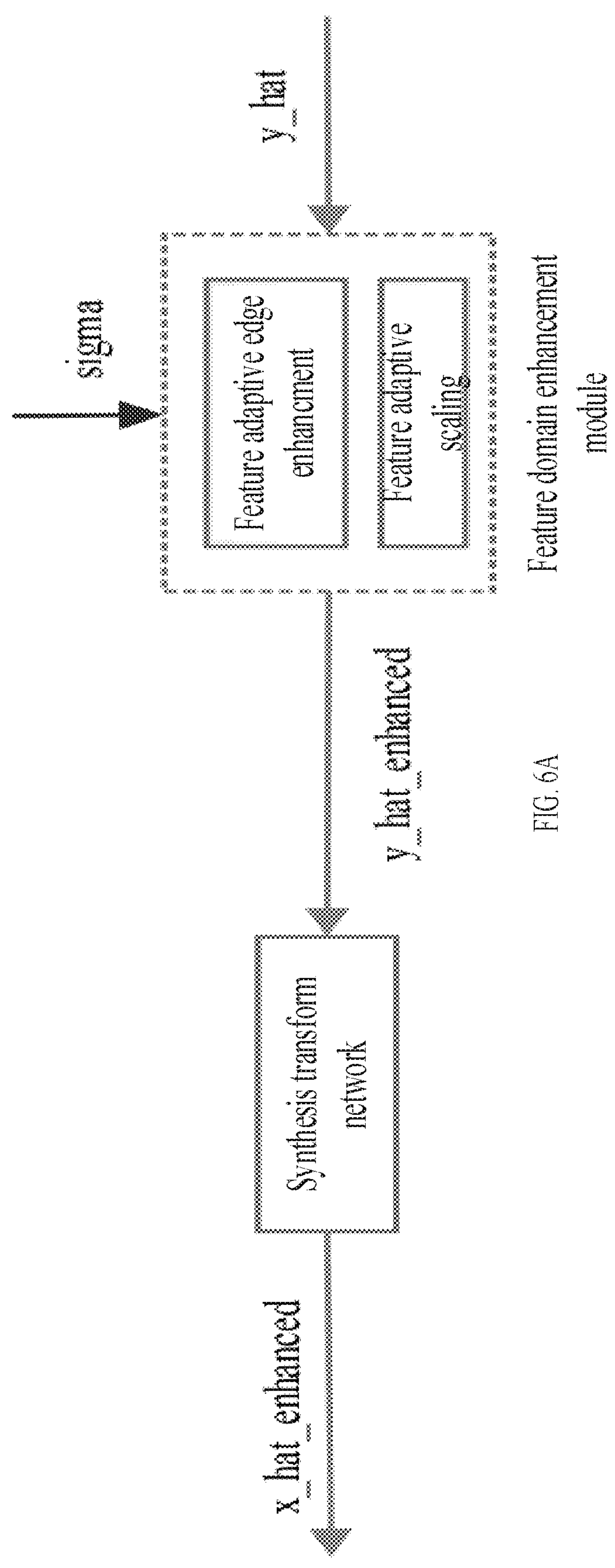
FIG. 6A is a schematic diagram of a position of a feature domain enhancement module according to an embodiment of the present disclosure.

Embodiment 5: based on Embodiments 3 and 4, a feature domain enhancement module can be added before the synthesis transform network, as shown in FIG. 6A. The input feature of the feature domain enhancement module can be the picture feature y_hat (hereinafter referred to as the initial reconstructed feature y_hat), and the output feature of the feature domain enhancement module can be the enhanced reconstructed feature y_hat_enhanced. The enhanced reconstructed feature y_hat_enhanced is input to a synthesis transform network, and the synthesis transform network performs a synthesis transform on the enhanced reconstructed feature y_hat_enhanced to obtain the target reconstructed picture block x_hat_enhanced corresponding to the current picture block x.

For the encoder, after obtaining the current picture block x, the picture feature y corresponding to the current picture block x is obtained by performing analysis transform on the current picture block x through an analysis transform network. Coefficient hyperparameter feature transform is performed on picture feature y by a hyperparameter encoding network, to obtain coefficient hyperparameter feature z. The coefficient hyperparameter feature corresponding to the current picture block (which can be the coefficient hyperparameter feature z itself or the hyperparameter quantization feature of the coefficient hyperparameter feature z) is encoded to obtain the first bitstream corresponding to the current picture block.

The first bitstream corresponding to the current picture block is decoded to obtain the coefficient hyperparameter feature z_hat corresponding to the current picture block (such as decoding the coefficient hyperparameter feature z_hat itself from the first bitstream, or decoding the hyperparameter feature from the first bitstream and performing inverse quantization on the hyperparameter quantized feature to obtain the coefficient hyperparameter feature z_hat). Then, the probability hyperparameter decoding network is used to perform inverse coefficient hyperparameter feature transform on the coefficient hyperparameter feature z_hat, to obtain the probability distribution parameter sigma.

The initial picture feature corresponding to the current picture block is encoded based on the probability distribution parameter sigma, to obtain the second bitstream corresponding to the current picture block. Where the initial picture feature can be picture feature y, residual feature r corresponding to picture feature y, picture feature s after feature processing of picture feature j or residual feature r, or picture quantization feature corresponding to picture feature y, residual feature r, or picture feature s, which is not limited.

Based on the probability distribution parameter sigma, the second bitstream corresponding to the current picture block is decoded to obtain the initial reconstructed feature y_hat corresponding to the current picture block. For example, if the initial picture feature is the picture feature y, the initial reconstructed feature y_hat is decoded from the second bitstream. If the initial picture feature is the picture quantization feature corresponding to the picture feature y, the picture quantization feature is decoded from the second bitstream, and the initial reconstructed feature y_hat is obtained by inverse quantization of the picture quantization feature. For example, if the initial picture feature is the residual feature r corresponding to the picture feature y, the residual feature r_hat is decoded from the second bitstream, and the initial reconstructed feature y_hat is determined based on the residual feature r_hat and the predicted value mu. If the initial picture feature is the picture quantization feature corresponding to the residual feature r, the picture quantization feature is decoded from the second bitstream, and the residual feature r_hat is obtained by inverse quantization of the picture quantization feature. Based on the residual feature r_hat and the predicted value mu, the initial reconstructed feature y_hat is determined. If the initial picture feature is the picture feature s corresponding to the residual feature r or the picture feature y, the picture feature s' is decoded from the second bitstream, and the picture feature s' is subjected to feature restoration to obtain the initial reconstructed feature y_hat or residual feature r_hat. If the residual feature r_hat is obtained, the initial reconstructed feature y_hat can further be determined based on the residual feature r_hat and the predicted value mu. If the initial picture feature is the picture quantization feature corresponding to the picture feature s, the picture quantization feature is decoded from the second bitstream, and inverse quantization is performed on the picture quantization feature to obtain the picture feature s'. The picture feature s' is then subjected to feature restoration to obtain the initial reconstructed feature y_hat or residual feature r_hat. If the residual feature r_hat is obtained, the initial reconstructed feature y_hat can further be determined based on the residual feature r_hat and the predicted value mu.

After obtaining the initial reconstructed feature y_hat, the initial reconstructed feature y_hat can be input to the feature domain enhancement module, and the feature domain enhancement module performs feature domain enhancement on the initial reconstructed feature y_hat to obtain the enhanced reconstructed feature y_hat_enhanced. The enhanced reconstructed feature y_hat_enhanced is then input to the synthesis transform network, and the synthesis transform network performs synthesis transform on the enhanced reconstructed feature y_hat_enhanced to obtain the target reconstructed picture block x_hat_enhanced corresponding to the current picture block x.

For the decoder, the first bitstream corresponding to the current picture block is decoded to obtain the coefficient hyperparameter feature z_hat corresponding to the current picture block (such as decoding the coefficient hyperparameter feature z_hat itself from the first bitstream, or decoding the hyperparameter feature from the first bitstream and performing inverse quantization on the hyperparameter quantized feature to obtain the coefficient hyperparameter feature z_hat). Then, the probability hyperparameter decoding network is used to perform inverse coefficient hyperparameter feature transform on the coefficient hyperparameter feature z_hat, to obtain the probability distribution parameter sigma.

Based on the probability distribution parameter sigma, the second bitstream corresponding to the current picture block is decoded to obtain the initial reconstructed feature y_hat corresponding to the current picture block. For example, the initial reconstructed feature y_hat is decoded from the second bitstream. Alternatively, the picture quantization feature is decoded from the second bitstream, and the initial reconstructed feature y_hat is obtained by inverse quantization of the picture quantization feature. For example, the residual feature r_hat is decoded from the second bitstream, and the initial reconstructed feature y_hat is determined based on the residual feature r_hat and the predicted value mu. Alternatively, the picture quantization feature can be decoded from the second bitstream, and the residual feature r_hat can be obtained by inverse quantization of the picture quantization feature. Based on the residual feature r_hat and the predicted value mu, the initial reconstructed feature y_hat can be determined. For example, the picture feature s' is decoded from the second bitstream, and the picture feature s' is subjected to feature restoration to obtain the initial reconstructed feature y_hat or residual feature r_hat. If the residual feature r_hat is obtained, the initial reconstructed feature y_hat can further be determined based on the residual feature r_hat and the predicted value mu. Alternatively, the picture quantization feature is decoded from the second bitstream, and inverse quantization is performed on the picture quantization feature to obtain the picture feature s'. The picture feature s' is then subjected to feature restoration to obtain the initial reconstructed feature y_hat or residual feature r_hat. If the residual feature r_hat is obtained, the initial reconstructed feature y_hat can further be determined based on the residual feature r_hat and the predicted value mu.

After obtaining the initial reconstructed feature y_hat, the initial reconstructed feature y_hat can be input to the feature domain enhancement module, and the feature domain enhancement module performs feature domain enhancement on the initial reconstructed feature y_hat to obtain the enhanced reconstructed feature y_hat_enhanced. The enhanced reconstructed feature y_hat_enhanced is then input to the synthesis transform network, and the synthesis transform network performs synthesis transform on the enhanced reconstructed feature y_hat_enhanced to obtain the target reconstructed picture block x_hat_enhanced corresponding to the current picture block x.

Figure 6B:
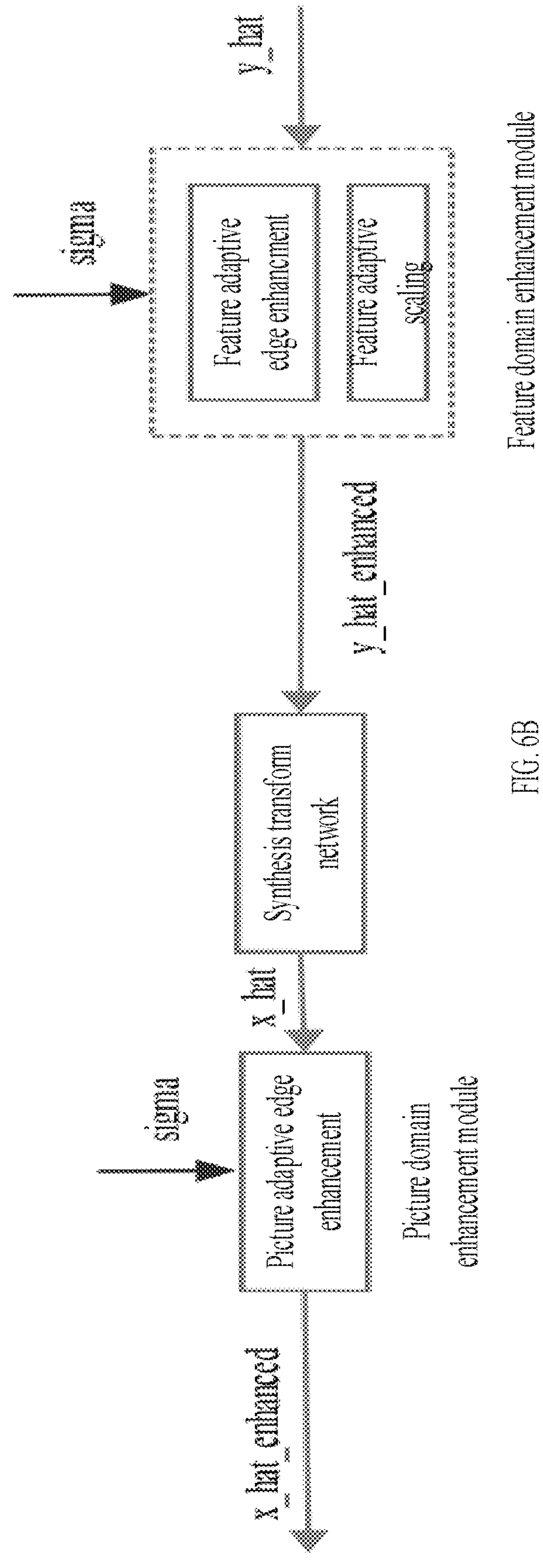
FIG. 6B is a schematic diagram of positions of a feature domain enhancement module and a picture domain enhancement module according to an embodiment of the present disclosure.

Embodiment 6: based on Embodiments 3 and 4, a feature domain enhancement module can be added before the synthesis transform network, and a picture domain enhancement module can be added after the synthesis transform network, as shown in FIG. 6B. The input feature of the feature domain enhancement module is the initial reconstructed feature y_hat, and the output feature of the feature domain enhancement module can be the enhanced reconstructed feature y_hat_enhanced. The enhanced reconstructed feature y_hat_enhanced can be input to a synthesis transform network, and the synthesis transform network performs synthesis transform on the enhanced reconstructed feature y_hat_enhanced to obtain the initial reconstructed picture block x_hat corresponding to the current picture block x. The input feature of the picture domain enhancement module can be the initial reconstructed picture block x_hat, and the output feature of the picture domain enhancement module can be the target reconstructed picture block x_hat_enhanced. That is, the picture domain enhancement module can perform picture domain enhancement on the initial reconstructed picture block x_hat, to obtain the target reconstructed picture block x_hat_enhanced corresponding to the current picture block x.

For the encoder, the picture feature y corresponding to the current picture block x is obtained by performing analysis transform on the current picture block x through an analysis transform network. Coefficient hyperparameter feature transform is performed on picture feature y by a hyperparameter encoding network, to obtain coefficient hyperparameter feature z. A coefficient hyperparameter feature corresponding to a current picture block is encoded to obtain a first bitstream corresponding to the current picture block. The first bitstream corresponding to the current picture block is decoded to obtain the coefficient hyperparameter feature z_hat corresponding to the current picture block, and the probability hyperparameter decoding network is used to perform inverse coefficient hyperparameter feature transform on the coefficient hyperparameter feature z_hat, to obtain the probability distribution parameter sigma. The initial picture feature corresponding to the current picture block is encoded based on the probability distribution parameter sigma, to obtain the second bitstream corresponding to the current picture block. Based on the probability distribution parameter sigma, the second bitstream corresponding to the current picture block is decoded to obtain the initial reconstructed feature y_hat corresponding to the current picture block. The above process can be referred to in Embodiment 5 and will not be repeated here.

After obtaining the initial reconstructed feature y_hat, the initial reconstructed feature y_hat can be input to the feature domain enhancement module, and the feature domain enhancement module performs feature domain enhancement on the initial reconstructed feature y_hat to obtain the enhanced reconstructed feature y_hat_enhanced. The enhanced reconstructed feature y_hat_enhanced is then input to the synthesis transform network, and the synthesis transform network performs synthesis transform on the enhanced reconstructed feature y_hat_enhanced to obtain the initial reconstructed picture block x_hat corresponding to the current picture block x.

After the initial reconstructed picture block x_hat corresponding to the current picture block x is obtained, the picture domain enhancement module can perform picture domain enhancement on the initial reconstructed picture block x_hat, to obtain the target reconstructed picture block x_hat_enhanced corresponding to the current picture block x.

For the decoder, the first bitstream corresponding to the current picture block is decoded to obtain the coefficient hyperparameter feature z_hat corresponding to the current picture block and the probability hyperparameter decoding network is used to perform inverse coefficient hyperparameter feature transform on the coefficient hyperparameter feature z_hat, to obtain the probability distribution parameter sigma. Based on the probability distribution parameter sigma, the second bitstream corresponding to the current picture block is decoded to obtain the initial reconstructed feature y_hat corresponding to the current picture block. The above process can be referred to in Embodiment 5 and will not be repeated here.

After obtaining the initial reconstructed feature y_hat, the initial reconstructed feature y_hat can be input to the feature domain enhancement module, and the feature domain enhancement module performs feature domain enhancement on the initial reconstructed feature y_hat to obtain the enhanced reconstructed feature y_hat_enhanced. The enhanced reconstructed feature y_hat_enhanced is then input to the synthesis transform network, and the synthesis transform network performs synthesis transform on the enhanced reconstructed feature y_hat_enhanced to obtain the initial reconstructed picture block x_hat corresponding to the current picture block x.

After the initial reconstructed picture block x_hat corresponding to the current picture block x is obtained, the picture domain enhancement module can perform picture domain enhancement on the initial reconstructed picture block x_hat, to obtain the target reconstructed picture block x_hat_enhanced corresponding to the current picture block x.

Figure 6C:
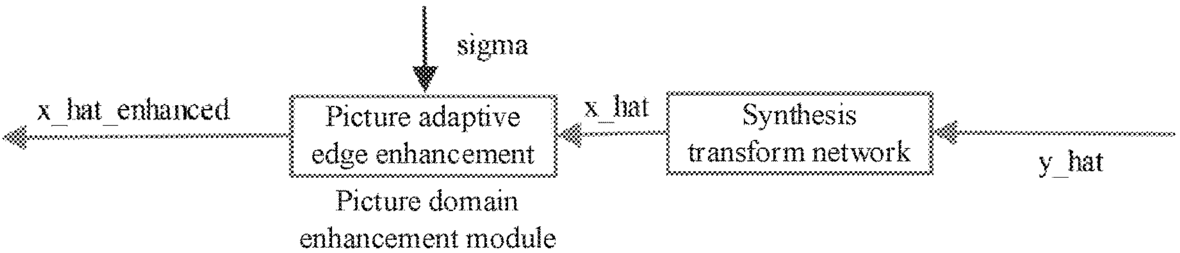
FIG. 6C is a schematic diagram of a position of a picture domain enhancement module according to an embodiment of the present disclosure.

Embodiment 7: based on Embodiments 3 and 4, a picture domain enhancement module can be added after the synthesis transform network, as shown in FIG. 6C. The input feature of the picture domain enhancement module can be the initial reconstructed picture block x_hat, and the output feature of the picture domain enhancement module can be the target reconstructed picture block x_hat_enhanced. That is, the picture domain enhancement module can perform picture domain enhancement on the initial reconstructed picture block x_hat to obtain the target reconstructed picture block x_hat_enhanced corresponding to the current picture block x.

For the encoder, the picture feature y corresponding to the current picture block x is obtained by performing analysis transform on the current picture block x through an analysis transform network. Coefficient hyperparameter feature transform is performed on picture feature y by a hyperparameter encoding network, to obtain coefficient hyperparameter feature z. A coefficient hyperparameter feature corresponding to a current picture block is encoded to obtain a first bitstream corresponding to the current picture block. The first bitstream corresponding to the current picture block is decoded to obtain the coefficient hyperparameter feature z_hat corresponding to the current picture block, and the probability hyperparameter decoding network is used to perform inverse coefficient hyperparameter feature transform on the coefficient hyperparameter feature z_hat, to obtain the probability distribution parameter sigma. The initial picture feature corresponding to the current picture block is encoded based on the probability distribution parameter sigma, to obtain the second bitstream corresponding to the current picture block. Based on the probability distribution parameter sigma, the second bitstream corresponding to the current picture block is decoded to obtain the initial reconstructed feature y_hat corresponding to the current picture block. The above process can be referred to in Embodiment 5 and will not be repeated here.

After the initial reconstructed feature y_hat is obtained, the initial reconstructed feature y_hat can be input to a synthesis transform network, and the synthesis transform network performs a synthesis transform on the initial reconstructed feature y_hat to obtain the initial reconstructed picture block x_hat corresponding to the current picture block x. After the initial reconstructed picture block x_hat corresponding to the current picture block x is obtained, the picture domain enhancement module can perform picture domain enhancement on the initial reconstructed picture block x_hat, to obtain the target reconstructed picture block x_hat_enhanced corresponding to the current picture block x.

For the decoder, the first bitstream corresponding to the current picture block is decoded to obtain the coefficient hyperparameter feature z_hat corresponding to the current picture block, and the probability hyperparameter decoding network is used to perform inverse coefficient hyperparameter feature transform on the coefficient hyperparameter feature z_hat, to obtain the probability distribution parameter sigma. Based on the probability distribution parameter sigma, the second bitstream corresponding to the current picture block is decoded to obtain the initial reconstructed feature y_hat corresponding to the current picture block. The above process can be referred to in Embodiment 5 and will not be repeated here.

After the initial reconstructed feature y_hat is obtained, the initial reconstructed feature y_hat can be input to a synthesis transform network, and the synthesis transform network performs a synthesis transform on the initial reconstructed feature y_hat to obtain the initial reconstructed picture block x_hat corresponding to the current picture block x. After the initial reconstructed picture block x_hat corresponding to the current picture block x is obtained, the picture domain enhancement module can perform picture domain enhancement on the initial reconstructed picture block x_hat, to obtain the target reconstructed picture block x_hat_enhanced corresponding to the current picture block x.

Embodiment 8: Embodiments 5 and 6 involve inputting the initial reconstructed feature y_hat into the feature domain enhancement module, and the feature domain enhancement module performs feature domain enhancement on the initial reconstructed feature y_hat to obtain the enhanced reconstructed feature y_hat_enhanced. For example, based on the feature domain enhancement parameter and the probability distribution parameter sigma corresponding to the current picture block, the initial reconstructed feature y_hat can be enhanced in the feature domain to obtain the enhanced reconstructed feature y_hat_enhanced. Feature domain enhancement can include feature adaptive edge enhancement and feature adaptive scaling. The probability distribution parameter sigma is used to assist in computation, determine the channels that require feature adaptive edge enhancement and the channels that require feature adaptive scaling, and determine the magnitude of the scaling. The following describes this process.

The initial reconstructed feature y_hat is a three-dimensional tensor of $C_1 \times H_L \times W_L$, where $C_L$ represents the number (i.e., the number of channels in the feature domain or the number of channels in the Latent domain) of channels in the initial reconstructed feature y_hat, $H_L$ represents the feature height (i.e., the feature height in the feature domain or the feature height in the Latent domain) of the initial reconstructed feature y_hat, and $W_L$ represents the feature width (i.e., the feature width in the feature domain or the feature width in the Latent domain) of the initial reconstructed feature y_hat. For each channel of the initial reconstructed feature y_hat, taking channel ch as an example, ch can be any value in $[1, 2, \ldots, C_L]$, and the two-dimensional tensor y_hat_ch of $H_L \times W_L$ of the shape corresponding to channel ch is called the feature channel map. Therefore, the initial reconstructed feature y_hat can include $C_L$ feature channel maps.

The probability distribution parameter sigma is also a three-dimensional tensor of $C_L \times H_L \times W_L$, where $C_L$ is the number of channels of the probability distribution parameter sigma. $H_L$ is the feature height of the probability distribution parameter sigma, and $W_L$ is the feature width of the probability distribution parameter sigma. For each channel of the probability distribution parameter sigma, taking channel ch as an example, ch can be any value in $[1, 2, \ldots, C_L]$, and the two-dimensional tensor sigma_ch of $H_L \times W_L$ of the shape corresponding to channel ch is called the a probability distribution channel map. Therefore, the probability distribution parameter sigma can include $C_L$ probability distribution channel maps, where the $C_L$ probability distribution channel maps respectively correspond to the $C_L$ feature channel maps. For example, the first probability distribution channel map corresponds to the first feature channel map, the second probability distribution channel map corresponds to the second feature channel map, . . . , the $C_L$-th probability distribution channel map corresponds to the $C_L$-th feature channel map.

For $C_1$ feature channel maps, $C_L$ feature channel maps can be divided into important feature channel maps and non-important feature channel maps. The important feature channel map can be at least one, and the non-important feature channel maps can be multiple. For example, at least one feature channel map can be selected from $C_L$ feature channel maps as at least one important feature channel map, and the remaining feature channel maps can be selected as non-important feature channel maps. Since the $C_L$ probability distribution channel maps respectively correspond to the $C_L$ feature channel maps, a probability distribution channel map corresponding to the important feature channel map can be selected as the important probability distribution channel map, and probability distribution channel maps corresponding to the non-important feature channel maps can be selected as the non-important probability distribution channel maps. For example, if the first feature channel map is an important feature channel map, then the first probability distribution channel map corresponding to the first feature channel map is selected as the important probability distribution channel map.

In summary, the initial reconstructed feature y_hat may include the important feature channel map and the non-important feature channel map, and the probability distribution parameter sigma may include the important probability distribution channel map corresponding to the important feature channel map and the non-important probability distribution channel map corresponding to the non-important feature channel map. For the important feature channel map, feature adaptive edge enhancement can be performed on the important feature channel map based on the feature domain enhancement parameter and important probability distribution channel map to obtain the first reconstructed feature after feature adaptive edge enhancement. For a non-important feature channel map, feature adaptive scaling can be performed on the non-important feature channel map based on feature domain enhancement parameter and non-important probability distribution channel map to obtain the second reconstructed feature after feature adaptive scaling. On this basis, an enhanced reconstructed feature y_hat_enhanced can be generated based on the first reconstructed feature and the second reconstructed feature.

For example, assuming that feature channel map 1 is an important feature channel map, feature channel maps 2 to 4 are non-important feature channel maps, probability distribution channel map 1 is an important probability distribution channel map, and probability distribution channel maps 2 to 4 are non-important probability distribution channel maps, then feature adaptive edge enhancement can be performed on feature channel map 1 based on feature domain enhancement parameter and probability distribution channel map 1 to obtain the first reconstructed feature 1 (i.e., the reconstructed feature of the first channel) after feature adaptive edge enhancement. Adaptive scaling can be performed on the feature channel map 2 based on feature domain enhancement parameter and probability distribution channel map 2 to obtain the second reconstructed feature 2 (i.e., the reconstructed feature of the second channel) after feature adaptive scaling. Adaptive scaling can be performed on the feature channel map 3 based on feature domain enhancement parameter and probability distribution channel map 3 to obtain the second reconstructed feature 3 (i.e., the reconstructed feature of the third channel) after feature adaptive scaling. Adaptive scaling can be performed on the feature channel map 4 based on feature domain enhancement parameter and probability distribution channel map 4 to obtain the second reconstructed feature 4 (i.e., the reconstructed feature of the fourth channel) after feature adaptive scaling. Then, the first reconstructed feature 1, the second reconstructed feature 2, the second reconstructed feature 3, and the second reconstructed feature 4 can be combined according to channels (such as being concatenated according to channels), that is, the reconstructed features of the four channels can be combined to obtain the enhanced reconstructed feature y_hat_enhanced.

Embodiment 9: in Embodiment 8, it is necessary to divide the $C_L$ feature channel maps into one or more important feature channel maps and non-important feature channel maps. For example, the $C_L$ feature channel maps can be divided into one or more important feature channel maps and non-important feature channel maps through the following method.

Method 1: The encoder encodes the important channel identifier in the third bitstream corresponding to the current picture block, and the decoder decodes the important channel identifier from the third bitstream corresponding to the current picture block.

For example, the encoder divides the $C_L$ feature channel maps into an important feature channel map and non-important feature channel maps, which is not limited, and encodes an important channel identifier (also referred to as the important channel number, denoted as important_channel) in the third bitstream corresponding to the current picture block. After receiving the third bitstream, the decoder decodes the important channel identifier from the third bitstream, selects the feature channel map corresponding to the important channel identifier from the $C_L$ feature channel maps as the important feature channel map, and selects the remaining feature channel maps as non-important feature channel maps. The probability distribution channel map corresponding to the important feature channel map is selected as the important probability distribution channel map, and the probability distribution channel maps corresponding to the non-important feature channel maps are selected as the non-important probability distribution channel maps.

Where when dividing the $C_L$ feature channel maps into an important feature channel map and non-important feature channel maps, the encoder can select the important feature channel maps from the $C_L$ feature channel maps based on the feature value in each feature channel map and the probability distribution value in each probability distribution channel map, and select the remaining feature channel maps as non-important feature channel maps.

Method 2: for both the encoding and decoding ends, the important feature channel map is selected from $C_L$ feature channel maps based on the feature value in each feature channel map and the probability distribution value in each probability distribution channel map.

For example, for each of the plurality of feature channel maps, based on feature values in the feature channel map and probability distribution values in the probability distribution channel map corresponding to the feature channel map, a number of consumed bits for the feature channel map can be determined. For example, the following formula can be used to determine the number of consumed bits for the feature channel map, where the following formula is only an example.

$$\text{bits\_per\_ch} = \sum_{1 \le j \le HL} \sum_{1 \le i \le WL} -\log 2\left(\Phi\left(\frac{\text{y\_hat\_ch}(i, j) + 0.5}{\text{sigma\_ch}(i, j)}\right) - \Phi\left(\frac{\text{y\_hat\_ch}(i, j) - 0.5}{\text{sigma\_ch}(i, j)}\right)\right)$$

In the above formula, bits_per_ch is used to represent the number of consumed bits for the feature channel map ch, y_hat_ch(i,j) is used to represent the feature value of the feature point (i,j) in the feature channel map ch, and sigma_ch(i,j) is used to represent the probability distribution value of the feature point (i,j) in the probability distribution channel map ch, where $\Phi(\bullet)$ represents the standard normal distribution function.

After processing each feature channel map as described above, the number of consumed bits for each feature channel map can be obtained. Based on the number of consumed bits for each feature channel map, one or more important feature channel maps can be selected from the $C_L$ feature channel maps. For example, the feature channel map with the highest bit consumption is determined as the important feature channel map, or K feature channel maps with highest bit consumption are determined as the important feature channel maps, where K can be a positive integer greater than 1.

After an important feature channel map is selected from the $C_L$ feature channel maps, the remaining feature channel maps can be selected as non-important feature channel maps, the probability distribution channel map corresponding to the important feature channel map can be selected as the important probability distribution channel map, and the probability distribution channel maps corresponding to the non-important feature channel maps can be selected as non-important probability distribution channel maps.

Method 3: for both the encoding and decoding ends, the important feature channel map is selected from $C_L$ feature channel maps based on the consumption rate corresponding to each feature channel map. For example, based on the consumption rate corresponding to each feature channel map, the $C_L$ feature channel maps can be sorted in descending order of consumption rate, and the top K feature channel maps can be selected as important feature channel maps. Alternatively, based on the consumption rate corresponding to each feature channel map, the $C_L$ feature channel maps can be sorted in ascending order of consumption rate, and K feature channel maps with lower ranking can be selected as important feature channel maps.

After an important feature channel map is selected from the $C_L$ feature channel maps, the remaining feature channel maps can be selected as non-important feature channel maps, the probability distribution channel map corresponding to the important feature channel map can be selected as the important probability distribution channel map, and the probability distribution channel maps corresponding to the non-important feature channel maps can be selected as non-important probability distribution channel maps.

Method 4: for both the encoding and decoding ends, a default feature channel map (i.e., a fixed feature channel map) is determined as the important feature channel map. For example, pre agree on the first feature channel map as the important feature channel map, or pre agree on the sixth feature channel map as the important feature channel map, or pre agree on the tenth feature channel map as the important feature channel map. Of course, any feature channel map can be determined as an important feature channel map without limitation.

Embodiment 10: in Embodiment 8, feature adaptive edge enhancement is performed on the important feature channel map based on the feature domain enhancement parameter and the important probability distribution channel map to obtain the first reconstructed feature. The following describes the process of feature adaptive edge enhancement.

For example, the feature domain enhancement parameter may include multiple edge enhancement segment magnitude values and multiple edge enhancement segment thresholds. For example, the encoder encodes multiple edge enhancement segment magnitude values and multiple edge enhancement segment thresholds in the third bitstream corresponding to the current picture block, and the decoder decodes multiple edge enhancement segment magnitude values and multiple edge enhancement segment thresholds from the third bitstream corresponding to the current picture block, with multiple edge enhancement segment magnitude values and multiple edge enhancement segment thresholds as the feature domain enhancement parameter.

The number of edge enhancement segment magnitude values and the number of edge enhancement segment thresholds can be the same or different. For example, if the two are the same, the encoder can also encode the number of edge enhancement segment magnitude values (or edge enhancement segment thresholds) in the third bitstream corresponding to the current picture block, and the decoder can decode the number of edge enhancement segment magnitude values from the third bitstream corresponding to the current picture block. Taking the number of edge enhancement segment magnitude values as n as an example, n edge enhancement segment magnitude values can be denoted as magl-1, magl-2, . . . , magl-n, and n edge enhancement segment thresholds can be denoted as thrl-1, thrl-2, . . . , thrl-n.

For example, multiple edge enhancement segment thresholds can form multiple edge enhancement threshold intervals, and multiple edge enhancement threshold intervals respectively correspond to multiple edge enhancement segment magnitude values, as shown in Table 1, which is an example of this correspondence.

TABLE 1

| Edge enhancement threshold interval | Edge enhancement segment magnitude value |
|---|---|
| Less than thrl-1 | 1 (i.e., without edge enhancement) |
| [thrl-1, thrl-2) | magl-1 |
| [thrl-2. thrl-3) | magl-2 |
| [thrl-3, thrl-4) | magl-3 |
| . . . | . . . |
| [thrl-(n-1), thrl-n) | magl-(n-1) |
| Greater than or equal to thrl-n | magl-n |

For example, the important probability distribution channel map may include multiple probability distribution values. For each probability distribution value, the edge enhancement threshold interval corresponding to the probability distribution value is first determined, and the edge enhancement segment magnitude value corresponding to the probability distribution value is determined based on the edge enhancement threshold interval. For example, if the probability distribution value is within [thrl-2, thrl-3), then the corresponding edge enhancement segment magnitude value is magl-2. If the probability distribution value is within [thrl-3, thrl-4), then the corresponding edge enhancement segment magnitude value is magl-3, and so on. After obtaining the edge enhancement segment magnitude value corresponding to each probability distribution value, the important feature channel map can be subjected to feature adaptive edge enhancement based on the edge enhancement segment magnitude value corresponding to each probability distribution value, to obtain the first reconstructed feature after feature adaptive edge enhancement.

For example, the following steps S11-S15 can be used to perform feature adaptive edge enhancement on the important feature channel map.

In step S11, the important feature channel map is normalized to obtain a normalized feature map.

For example, normalization can be performed based on the important feature channel map, the mean feature corresponding to the important feature channel map, and the standard deviation feature corresponding to the important feature channel map to obtain a normalized feature map. For example, the normalized feature map can be obtained by subtracting the mean feature from the important feature channel map and then dividing it by the standard deviation feature. For example, the mean feature can be subtracted from the important feature channel map, then divided by the standard deviation feature to obtain the intermediate feature. Then, the intermediate feature can be transformed to obtain a normalized feature map, such as multiplying the intermediate feature by 0.1 and adding 0.5 (both 0.1 and 0.5 are examples), and then limiting the feature value to between 0 and 1. Of course, the above are just a few examples of normalizing the important feature channel map, and there is no limitation on the normalization method.

In step S12, a high-frequency detail picture is generated based on the important feature channel map and the normalized feature map.

For example, the normalized feature map can be convolved (such as by a two-dimensional convolution operation) with a Gaussian blur convolution kernel (which can be a 3×3 convolution kernel or other sized convolution kernels, without limitation) to obtain a Gaussian blur picture. Then, the Gaussian blur picture can be subtracted from the important feature channel map to obtain the high-frequency detail picture. Of course, the above is only an example of generating the high-frequency detail picture, as long as the high-frequency details of the important feature channel map can be obtained, there is no limitation on this.

In step S13, for each feature value in the high-frequency detail picture, edge enhancement is performed on the feature value based on the edge enhancement segment magnitude value corresponding to the probability distribution value corresponding to the feature value, to obtain the edge enhanced feature value.

For example, the important feature channel map includes multiple feature values, and the important probability distribution channel map includes multiple probability distribution values, and the multiple probability distribution values respectively correspond to the multiple feature values. Also, since the high-frequency detail picture includes multiple feature values (respectively corresponding to the multiple feature values of the important feature channel map), the multiple probability distribution values of the important probability distribution channel map respectively correspond to the multiple feature values of the high-frequency detail picture. Based on this, for each feature value in high-frequency detail picture, the probability distribution value corresponding to the feature value can be determined from the important probability distribution channel map, and the edge enhancement threshold interval corresponding to the probability distribution value can be determined. Based on the edge enhancement threshold interval, the edge enhancement segment magnitude value corresponding to the probability distribution value can be determined.

After obtaining the edge enhancement segment magnitude value corresponding to the probability distribution value, edge enhancement can be performed on the feature value based on the edge enhancement segment magnitude value to obtain the edge enhanced feature value. For example, the feature value is multiplied by the edge enhancement segment magnitude value (such as magl-1, magl-2, etc.), to obtain the edge enhanced feature value. If the edge enhancement threshold interval is "less than thrl-1", the feature value is multiplied by 1, that is, keep the feature value unchanged, not performing edge enhancement on the feature value. If the edge enhancement threshold interval is [thrl-1, thrl-2), the feature value is multiplied by magl-1, where magl-t is a value greater than 1, to perform edge enhancement on the feature value. Similarly, other edge enhancement segment magnitude values such as magl-2 are greater than 1, which can achieve edge enhancement.

For each feature value in the high-frequency detail picture, the edge enhancement segment magnitude value corresponding to the feature value can be obtained using the above method. Then, based on the edge enhancement segment magnitude value, edge enhancement can be performed on the feature value to obtain the edge enhanced feature value.

In step S14, the edge enhanced feature map is determined based on the edge enhanced feature value corresponding to each feature value. For example, the edge enhanced feature map can be obtained by combining the edge enhanced feature values corresponding to all feature values.

In step S15, the edge enhanced feature map is subjected to inverse normalization to obtain the first reconstructed feature (i.e., the first reconstructed feature map). The first reconstructed feature (map) is the reconstructed feature (map) obtained by performing feature adaptive edge enhancement on the important feature channel map.

After obtaining the edge enhanced feature map, the first reconstructed feature map can be obtained by directly performing inverse normalization on the edge enhanced feature map. Alternatively, after obtaining the edge enhanced feature map, the edge enhanced feature map can be added to the normalized feature map to obtain a modified edge enhanced feature map. The modified edge enhanced feature map can then be inverse normalized to obtain the first reconstructed feature map.

For example, the edge enhanced normalized feature map can be determined based on the edge enhanced feature map, and the first reconstructed feature map can be determined based on the edge enhanced normalized feature map, the mean feature corresponding to the edge enhanced normalized feature map, and the standard deviation feature corresponding to the edge enhanced normalized feature map. The first reconstructed feature can also be referred to as y_hat_sharp.

For example, the edge enhanced feature map can be transformed to obtain an edge enhanced normalized feature map. For example, the feature value in the edge enhanced feature map is first limited to between 0 and 1, then 0.5 is subtracted from the feature value in the edge enhanced feature map and it is divided by 0.1 (both 0.5 and 0.1 are examples) to obtain the edge enhanced normalized feature map.

The edge enhanced normalized feature map is multiplied by the standard deviation feature, and then the mean feature is added to obtain the edge enhanced feature map corresponding to the important feature channel map. The edge enhanced feature map is denoted as the first reconstructed feature y_hat_sharp.

Of course, the above is only an example of inverse normalization of edge enhanced feature maps, and there is no limitation on this inverse normalization method.

In an implementation, the encoder needs to encode multiple edge enhancement segment magnitude values and multiple edge enhancement segment thresholds in the third bitstream corresponding to the current picture block. For this process, the encoder can adopt the following approach.

The encoder can configure multiple candidate feature domain enhancement parameters. For each candidate feature domain enhancement parameter, the candidate feature domain enhancement parameter can include multiple edge enhancement segment magnitude values and multiple edge enhancement segment thresholds. The cost value corresponding to each candidate feature domain enhancement parameter can be determined. Based on the cost value corresponding to each candidate feature domain enhancement parameter, the feature domain enhancement parameter (i.e., the candidate feature domain enhancement parameter with the smallest cost value) corresponding to the current picture block can be selected from all candidate feature domain enhancement parameter. The encoder can encode the feature domain enhancement parameter to obtain the third bitstream corresponding to the current picture block.

For example, for each candidate feature domain enhancement parameter, the initial reconstructed feature can be enhanced based on the candidate feature domain enhancement parameter and probability distribution parameter to obtain enhanced reconstructed feature. The feature domain enhancement process is described in the above embodiments. Based on the enhanced reconstructed feature, the target reconstructed picture block x_hat_enhanced is determined, and based on the target reconstructed picture block x_hat_enhanced, the cost value corresponding to the candidate feature domain enhancement parameter is determined. There is no limitation on the method of determining the cost value.

For example, for each candidate feature domain enhancement parameter, the candidate feature domain enhancement parameter includes magl-L, magl-2, . . . , magl-n, thrl-1, thrl-2, . . . , thrl-n. Based on the candidate feature domain enhancement parameter, the enhanced reconstructed feature can be obtained, and then the target reconstructed picture block x_hat_enhanced can be obtained. The distortion index value between the target reconstructed picture block x_hat_enhanced and the current picture block x is calculated using the distortion index. After obtaining the distortion index value corresponding to each candidate feature domain enhancement parameter, the candidate feature domain enhancement parameter (i.e., the optimal feature domain enhancement parameter) corresponding to the minimum distortion index value can be selected as the feature domain enhancement parameter corresponding to the current picture block. In this way, the encoder encodes the feature domain enhancement parameter in the third bitstream.

Embodiment 11: In Embodiment 8, it is necessary to perform feature adaptive scaling on the non-important feature channel map based on feature domain enhancement parameter and the non-important probability distribution channel map (i.e., the non-important probability distribution channel map corresponding to the non-important feature channel map) to obtain the second reconstructed feature after feature adaptive scaling. The following describes the process of feature adaptive scaling.

For example, the feature domain enhancement parameter may include a scaling parameter value. For example, the encoder can encode the scaling parameter value in the third bitstream corresponding to the current picture block, and the decoder can decode the scaling parameter value from the third bitstream corresponding to the current picture block, where the scaling parameter value can be used as a feature domain enhancement parameter, and can be denoted as p.

For example, a non-important feature channel map may include multiple feature values, and the non-important probability distribution channel map corresponding to the non-important feature channel map may include multiple probability distribution values, and the multiple probability distribution values respectively correspond to the multiple feature values. Based on this, for each feature value in the non-important feature channel map, the scaled feature value corresponding to the feature value can be determined based on the feature value, the scaling parameter value, and the probability distribution value corresponding to the feature value. For example, the following formula can be used to determine the scaled feature value corresponding to the feature value. The following formula is only an example, which is not limited.

$$\text{y\_hat\_scale} = \text{y\_hat} + \rho * clip3(*\text{y\_hat}, -0.5, 05)$$

In the above formula, y_hat_scale represents the scaled feature value, y_hat represents the feature value in the non-important feature channel map, p represents the scaling parameter value, sigma represents the probability distribution value in the non-important probability distribution channel map, and the probability distribution value sigma corresponds to the feature value y_hat. clip3 is a value clipping operation used to clip sigma*y_hat to between −0.5 and 0.5. −0.5 and 0.5 are configurable values, which is not limited. If sigma*y_hat is less than −0.5, sigma*y_hat will be clipped to −0.5; if sigma*y_hat is greater than 0.5, sigma*y_hat will be clipped to 0.5; if sigma*y_hat is greater than or equal to −0.5 but less than or equal to 0.5, the value of sigma*y_hat will remain unchanged.

After processing each feature value in the non-important feature channel map as described above, the scaled feature value corresponding to each feature value can be obtained, and then the second reconstructed feature (i.e., the second reconstructed feature map) can be determined based on the scaled feature value corresponding to each feature value. The second reconstructed feature (picture) is the reconstructed feature (picture) obtained by performing adaptive scaling on the non-important feature channel map, such as combining the scaled feature values corresponding to all feature values to obtain the second reconstructed feature map. The second reconstructed feature is also referred to as y_hat_scale.

The second reconstructed feature y_hat_scale corresponds to the non-important feature channel map of the initial reconstructed feature y_hat, that is, the non-important feature channel map is scaled to obtain the second reconstructed feature y_hat_scale. The first reconstructed feature y_hat_sharp corresponds to the important feature channel map of the initial reconstructed feature y_hat, that is, the important feature channel map is enhanced to obtain the first reconstructed feature y_hat_sharp. The second reconstructed feature y_hat_scale and the first reconstructed feature y_hat_sharp are combined to obtain the enhanced reconstructed feature y_hat_enhanced.

In an implementation, the encoder needs to encode the scaling parameter value in the third bitstream corresponding to the current picture block. For this process, the encoder can adopt the following approach. The encoder can configure multiple candidate scaling parameter values, determine the cost value corresponding to each candidate scaling parameter value, and based on the cost value corresponding to each candidate scaling parameter value, select the scaling parameter value (i.e., the candidate scaling parameter value with the smallest cost value) corresponding to the current picture block from all candidate scaling parameter value. The encoder can encode the scaling parameter value to obtain the third bitstream corresponding to the current picture block.

For example, for each candidate scaling parameter value, the non-important feature channel map can be adaptively scaled based on the candidate scaling parameter value and the non-important probability distribution channel map to obtain the second reconstructed feature after feature adaptive scaling. Then, based on the second reconstructed feature, the enhanced reconstructed feature can be obtained. Based on the enhanced reconstructed feature, the target reconstructed picture block x_hat_enhanced can be determined, and the cost value corresponding to the candidate scaling parameter value can be determined based on the target reconstructed picture block x_hat_enhanced.

For example, for each candidate scaling parameter value, the enhanced reconstructed feature can be obtained based on the candidate scaling parameter value, and then the target reconstructed picture block x_hat_enhanced can be obtained. The distortion index value between the target reconstructed picture block x_hat_enhanced and the current picture block x is calculated using the distortion index. After obtaining the distortion index value corresponding to each candidate scaling parameter value, the encoder can select the candidate scaling parameter value (i.e., the optimal scaling parameter value) corresponding to the minimum distortion index value as the scaling parameter value corresponding to the current picture block. The encoder can encode the scaling parameter value in the third bitstream.

In another implementation, the encoder is configured with multiple candidate feature domain enhancement parameters. For each candidate feature domain enhancement parameter, the candidate feature domain enhancement parameter includes multiple edge enhancement segment magnitude values, multiple edge enhancement segment thresholds, and a scaling parameter value. The cost value corresponding to each candidate feature domain enhancement parameter is determined. Based on the cost value corresponding to each candidate feature domain enhancement parameter, the feature domain enhancement parameter (i.e., the candidate feature domain enhancement parameter with the smallest cost value) corresponding to the current picture block is selected from all candidate feature domain enhancement parameter. The encoder encodes the feature domain enhancement parameter (i.e., multiple edge enhancement segment magnitude values, multiple edge enhancement segment thresholds, and a scaling parameter value) to obtain the current picture block, to obtain the third bitstream corresponding to the current picture block. For example, for each candidate feature domain enhancement parameter, the initial reconstructed feature is enhanced based on the candidate feature domain enhancement parameter and probability distribution parameter to obtain enhanced reconstructed feature. Based on the enhanced reconstructed feature, the target reconstructed picture block x_hat_enhanced is determined, and the cost value corresponding to the candidate feature domain enhancement parameter is determined based on the target reconstructed picture block x_hat_enhanced.

Embodiment 12: Embodiments 6 and 7 involve inputting the initial reconstructed picture block x_hat to the picture domain enhancement module, where the picture domain enhancement module performs picture domain enhancement on the initial reconstructed picture block x_hat to obtain the target reconstructed picture block x_hat_enhanced corresponding to the current picture block x. For example, based on the picture domain enhancement parameter and probability distribution parameter sigma corresponding to the current picture block, the initial reconstructed picture block x_hat can be subjected to picture adaptive edge enhancement to obtain the target reconstructed picture block x_hat_enhanced corresponding to the current picture block. The following will explain the process of picture adaptive edge enhancement.

For example, the picture domain enhancement parameter may include multiple picture enhancement segment magnitude values and multiple picture enhancement segment thresholds. For example, the encoder encodes multiple picture enhancement segment magnitude values and multiple picture enhancement segment thresholds in the third bitstream corresponding to the current picture block, and the decoder decodes multiple picture enhancement segment magnitude values and multiple picture enhancement segment thresholds from the third bitstream corresponding to the current picture block, with multiple picture enhancement segment magnitude values and multiple picture enhancement segment thresholds as the picture domain enhancement parameter.

The number of picture enhancement segment magnitude values and the number of picture enhancement segment thresholds can be the same or different. For example, if the two are the same, the encoder can also encode the number of picture enhancement segment magnitude values (or picture enhancement segment thresholds) in the third bitstream corresponding to the current picture block, and the decoder can decode the number of picture enhancement segment magnitude values from the third bitstream corresponding to the current picture block. Taking the number of picture enhancement segment magnitude values as m as an example, m picture enhancement segment magnitude values are denoted as magy-1, magy-2, . . . , magy-m, and m picture enhancement segment thresholds are denoted as thry-1, thry-2, thry-m.

For example, multiple picture enhancement segment thresholds can form multiple picture enhancement threshold intervals, and multiple picture enhancement threshold intervals respectively correspond to multiple picture enhancement segment intensity values, as shown in Table 2, which is an example of this correspondence.

TABLE 2

| Picture enhancement threshold interval | Picture enhancement segment magnitude value |
|---|---|
| Less than thry -1 | 1 (i.e., without edge enhancement) |
| [thry-1, thry-2) | magy-1 |
| [thry-2, thry-3) | magy-2 |
| [thry-3, thry-4) | magy-3 |
| . . . | . . . |
| [thry-(m-1), thry-m) | magy- (m-1) |
| Greater than or equal to thry-m | magy-m |

For example, the following steps S21-S23 can be used to perform picture adaptive edge enhancement on the initial reconstructed picture block x_hat.

In step S21, the target probability distribution channel map is obtained based on the probability distribution parameter.

The initial reconstructed picture block x_hat is a two-dimensional tensor of H×W, where H represents the picture height of the initial reconstructed picture block x_hat, and W represents the picture width of the initial reconstructed picture block x_hat. The probability distribution parameter sigma is a three-dimensional tensor of $C_L \times H_L \times W_L$, where $C_L$ is the number of channels of the probability distribution parameter sigma, $H_L$ is the feature height of the probability distribution parameter sigma, and $W_L$ is the feature width of the probability distribution parameter sigma. The picture height $H_L$ of the initial reconstructed picture block x_hat can be greater than the feature height $H_L$ of the probability distribution parameter sigma, such as the picture height H being 4 times, 8 times, 16 times the feature height $H_L$, etc. The picture width 11 of the initial reconstructed picture block x_hat can be greater than the feature width $W_L$ of the probability distribution parameter sigma, such as the picture width W being 4 times, 8 times, 16 times the feature width $W_L$, etc.

To use the probability distribution parameter for picture adaptive edge enhancement of the initial reconstructed picture block x_hat, it is necessary to obtain the target probability distribution channel map based on the probability distribution parameter. The target probability distribution channel map is a two-dimensional tensor of H×W.

For example, a probability distribution channel map can be selected from $C_L$ probability distribution channel maps. Since the probability distribution parameter sigma includes at least one important probability distribution channel map and multiple non-important probability distribution channel maps, it is possible to select one important probability distribution channel map from $C_L$ probability distribution channel maps or one non-important probability distribution channel map from $C_L$ probability distribution channel maps. Take selecting one important probability distribution channel map as an example for further explanation.

Then, the important probability distribution channel map is upsampled to obtain the target probability distribution channel map. There are no restrictions on the upsampling method, and the size of the target probability distribution channel map should be the same as the size of the initial reconstructed picture block x_hat.

For example, the nearest-neighbor upsampling method can be used to upsample the important probability distribution channel map to obtain the target probability distribution channel map. For the nearest-neighbor upsampling method, a pixel can be selected from the original low-resolution picture (i.e., the important probability distribution channel map) as the center point of the corresponding region on the target high-resolution picture (i.e., the target probability distribution channel map). The value of the nearest pixel to the selected pixel on the original low-resolution picture is determined as the value of the corresponding pixel on the target high-resolution picture. The above process is repeated until all pixels of the high-resolution target picture are assigned values.

In summary, the important probability distribution channel map can be upsampled to the same size as the initial reconstructed picture block x_hat, and the upsampled probability distribution channel map can be referred to as the target probability distribution channel map sigma_ch_upscale.

In step S22, if the target probability distribution channel map includes probability distribution values, for each of the probability distribution values, the picture enhancement segment magnitude value corresponding to the probability distribution value is determined based on the picture enhancement threshold interval corresponding to the probability distribution value.

For example, the target probability distribution channel map may include multiple probability distribution values. For each probability distribution value, the picture enhancement threshold interval corresponding to the probability distribution value is can first determined, and the picture enhancement segment magnitude value corresponding to the probability distribution value is determined based on the picture enhancement threshold interval. For example, if the probability distribution value is within [thry-2, thry-3), then the corresponding edge enhancement segment magnitude value is magy-2. If the probability distribution value is within [thry-3, thry-4), then the corresponding edge enhancement segment magnitude value is magy-3, and so on.

In step S23, based on the picture enhancement segment magnitude value corresponding to each of the probability distribution values, picture adaptive edge enhancement is performed on the initial reconstructed picture block to obtain the target reconstructed picture block x_hat_enhanced corresponding to the current picture block.

Firstly, a high-frequency detail picture can be generated based on the initial reconstructed picture block x_hat. For example, the initial reconstructed picture block x_hat can be convolved with a Gaussian blur convolution kernel (which can be a 3*3 convolution kernel or other sizes, with no restrictions on this convolution kernel) to obtain a Gaussian blur picture, and then the Gaussian blur picture can be subtracted from the initial reconstructed picture block x_hat to obtain a high-frequency detail picture. Of course, the above is only an example of generating high-frequency detail picture, as long as the high-frequency details of the initial reconstructed picture block x_hat can be obtained, there is no limitation on this.

Then, for each feature value in the high-frequency detail picture, based on the probability distribution value corresponding to the feature value, the picture enhancement segment magnitude value is used to perform edge enhancement on the feature value, to obtain the picture enhanced feature value. For example, the initial reconstructed picture block x_hat includes multiple feature values, the target probability distribution channel map includes multiple probability distribution values, and the multiple probability distribution values respectively correspond to the multiple feature values. Also, since the high-frequency detail picture includes multiple feature values (respectively corresponding to the multiple feature values of the initial reconstructed picture block x_hat), the multiple probability distribution values of the target probability distribution channel map respectively correspond to the multiple feature values of the high-frequency detail picture. Based on this, for each feature value in high-frequency detail picture, the probability distribution value corresponding to the feature value can be determined from the target probability distribution channel map, and the picture enhancement threshold interval corresponding to the probability distribution value can be determined. Based on the picture enhancement threshold interval, the picture enhancement segment magnitude value corresponding to the probability distribution value can be determined.

After obtaining the edge enhancement segment magnitude value corresponding to the probability distribution value, picture enhancement can be performed on the feature value based on the picture enhancement segment magnitude value to obtain the picture enhanced feature value. For example, the feature value is multiplied by the picture enhancement segment magnitude value (such as magy-1, magy-2, etc.), to obtain the picture enhanced feature value. If the picture enhancement threshold interval is "less than thry-1", the feature value is multiplied by 1, that is, keep the feature value unchanged, not performing edge enhancement on the feature value. If the picture enhancement threshold interval is [thry-1, thry-2), the feature value is multiplied by magy-1, where magy-1 is a value greater than 1, to perform edge enhancement on the feature value. Similarly, other picture enhancement segment magnitude values such as magy-2 that are greater than 1 can achieve edge enhancement.

Then, the target reconstructed picture block x_hat_enhanced is determined based on the picture enhanced feature value corresponding to each feature value in the high-frequency detail picture. For example, for each feature value in high-frequency detail picture, the picture enhanced feature value corresponding to the feature value can be obtained using the above method, and then the picture enhancement feature map can be determined based on the picture enhanced feature value corresponding to each feature value. For example, the picture enhanced feature map can be obtained by combining the picture enhanced feature values corresponding to all feature values. Then, the picture enhancement feature map is added to the initial reconstructed picture block x_hat to obtain the final edge enhanced picture. The edge enhanced picture is then clipped to the value range of the picture to obtain the target reconstructed picture block x_hat_enhanced.

In an implementation, the encoder needs to encode multiple picture enhancement segment magnitude values and multiple picture enhancement segment thresholds in the third bitstream corresponding to the current picture block. For this process, the encoder can adopt the following approach.

The encoder can configure multiple candidate picture domain enhancement parameters. For each candidate picture domain enhancement parameter, the candidate picture domain enhancement parameter can include multiple picture enhancement segment magnitude values and multiple picture enhancement segment thresholds. The cost value corresponding to each candidate picture domain enhancement parameter can be determined. Based on the cost value corresponding to each candidate picture domain enhancement parameter, the picture domain enhancement parameter (i.e., the candidate picture domain enhancement parameter with the smallest cost value) corresponding to the current picture block can be selected from all candidate picture domain enhancement parameter. The encoder can encode the picture domain enhancement parameter to obtain the third bitstream corresponding to the current picture block.

For example, for each candidate picture domain enhancement parameter, based on the candidate picture domain enhancement parameter and probability distribution parameter, the initial reconstructed picture block x_hat is subjected to picture adaptive edge enhancement to obtain the target reconstructed picture block x_hat_enhanced corresponding to the current picture block. The picture adaptive edge enhancement process is described in the above embodiment and will not be repeated here. Based on the target reconstructed picture block x_hat_enhanced, the cost value corresponding to the candidate picture domain enhancement parameter is determined. There is no limitation on the method of determining the cost value.

For example, for each candidate picture domain enhancement parameter, the candidate picture domain enhancement parameter includes magy-1, magy-2, . . . , magy-m, thry-1, thry-2, . . . , thry-m. Based on the candidate picture domain enhancement parameter, the target reconstructed picture block x_hat_enhanced can be obtained. The distortion index value between the target reconstructed picture block x_hat_enhanced and the current picture block x is calculated using the distortion index. After obtaining the distortion index value corresponding to each candidate picture domain enhancement parameter, the candidate picture domain enhancement parameter (i.e., the optimal picture domain enhancement parameter) corresponding to the minimum distortion index value can be selected as the picture domain enhancement parameter corresponding to the current picture block. In this way, the encoder encodes the picture domain enhancement parameter in the third bitstream.

Embodiment 13: for Embodiments 5 to 12, if a feature domain enhancement module is added before the synthesis transform network, the feature domain enhancement module can perform feature domain enhancement on the luma component, the chroma component, or both the luma and chroma components. In this embodiment, the feature domain enhancement of the luma component is taken as an example. To perform feature domain enhancement on the luma component, feature domain enhancement can be performed on the initial reconstructed feature y_hat corresponding to the luma component of the current picture block based on the feature domain enhancement parameter and probability distribution parameter, to obtain the enhanced reconstructed feature y_hat_enhanced corresponding to the luma component. The process of feature domain enhancement can be referred to in Embodiments 5 to 12, which will not be repeated here.

For embodiments 5 to 12, if a picture domain enhancement module is added after the synthesis transform network, the picture domain enhancement module can perform picture domain enhancement on the luma component, the chroma component, or both the luma and chroma components. In this embodiment, the picture domain enhancement of both luma and chroma components is taken as an example. For example, to perform picture domain enhancement on the luma component, picture adaptive edge enhancement can be performed on the initial reconstructed picture block x_hat corresponding to the luma component of the current picture block based on the picture domain enhancement parameter and probability distribution parameter, to obtain the target reconstructed picture block x_hat_enhanced corresponding to the luma component. The picture domain enhancement process can refer to embodiments 5 to 12, and will not be repeated here. In addition, to enhance the chroma components in the picture domain, picture adaptive edge enhancement can be performed on the initial reconstructed picture block x_hat corresponding to the chroma component of the current picture block based on the picture domain enhancement parameter and probability distribution parameter, to obtain the target reconstructed picture block x_hat_enhanced corresponding to the chroma component.

When performing picture adaptive edge enhancement on the initial reconstructed picture block x_hat corresponding to the chroma component, the target probability distribution channel map of the chroma component can be obtained based on the probability distribution parameter of the luma component. For example, an important probability distribution channel map is selected from all probability distribution channel maps of the probability distribution parameter of the luma component, and the important probability distribution channel map is upsampled, to obtain the target probability distribution channel map of the chroma component. The size of the target probability distribution channel map is the same as the size of the initial reconstructed picture block x_hat corresponding to the chroma component. For example, using the nearest-neighbor upsampling method to upsample the important probability distribution channel map to obtain the target probability distribution channel map of the chroma component. For the nearest-neighbor upsampling method, a pixel can be selected from the original low-resolution picture (i.e., the important probability distribution channel map) as the center point of the corresponding region on the target high-resolution picture (i.e., the target probability distribution channel map). The value of the nearest pixel to the selected pixel on the original low-resolution picture is determined as the value of the corresponding pixel on the target high-resolution picture. The above process is repeated until all pixels of the high-resolution target picture are assigned values.

After obtaining the target probability distribution channel map of the chroma component, for each probability distribution value in the target probability distribution channel map, the picture enhancement segment magnitude value corresponding to the probability distribution value is determined based on the picture enhancement threshold interval corresponding to the probability distribution value. Based on the picture enhancement segment magnitude value corresponding to each probability distribution value, the initial reconstructed picture block x_hat corresponding to the chroma component is subjected to picture adaptive edge enhancement to obtain the target reconstructed picture block x_hat_enhanced corresponding to the chroma component. Where the picture adaptive edge enhancement process can refer to Embodiment 12, and relevant operations can be performed for the chroma component.

Embodiment 14: A decoding method is proposed in this embodiment, which may include the following steps S31 to S38.

In step S31, the feature domain enhancement parameter and picture domain enhancement parameter are decoded from Bitstream #3 (i.e., the third bitstream, also referred to as the feature enhancement header information bitstream) corresponding to the current picture block. Where the feature domain enhancement parameter may include important channel identifier (important channel number import channel), multiple edge enhancement segment magnitude values (referred to as magl-1, magl-2, . . . , magl-n), multiple edge enhancement segment thresholds (referred to as thrl-1, thrl-2, . . . , thrl-n), and scaling parameter value ρ. The picture domain enhancement parameter may include multiple picture enhancement segment magnitude values (referred to as magy-1, magy-2, . . . , magy-m), and multiple picture enhancement segment thresholds (referred to as thry-1, thry-2, . . . , thry-m). The feature domain enhancement parameter may also include the number n of edge enhancement segment magnitude values, and the picture domain enhancement parameter may also include the number m of picture enhancement segment magnitude values.

In step S32, the input features of the feature domain enhancement module are the initial reconstructed feature y_hat and the probability distribution parameter sigma. The initial reconstructed feature y_hat is a three-dimensional tensor of $C_L \times H_L \times W_L$, where $C_L$ represents the number of channels in the Latent domain, $H_L$ represents the feature height in the Latent domain, and $W_L$ represents the feature width in the Latent domain. The probability distribution parameter sigma is a three-dimensional tensor of $C_L \times H_L \times W_L$. When the channel of the initial reconstructed feature y_hat is any one of the values [1, 2, . . . , $C_L$], the two-dimensional tensor y_hat_ch of the shape $H_L \times W_L$ is called the feature channel map. When the channel of the probability distribution parameter sigma is any one of the values [1, 2, . . . , $C_L$], the two-dimensional tensor sigma_ch of the shape $H_L \times W_L$ is called the probability distribution channel map.

In step S33, the initial reconstructed feature y_hat has a total of $C_L$ feature channel maps, and the probability distribution parameter sigma has a total of $C_L$ probability distribution channel maps. The $C_L$ probability distribution channel maps respectively correspond to the $C_L$ feature channel maps, and the probability distribution channel map are represented as sigma_ch. Feature adaptive edge enhancement is performed on the feature channel map where channel ch is an important channel identifier important_channel, and feature adaptive scaling is performed on the feature channel map where channel ch is a non-important channel identifier.

In step S34, for the feature adaptive edge enhancement process, the input data includes the important feature channel map y_hat_ch, the important probability distribution channel map sigma_ch, multiple edge enhancement segment magnitude values (magl-1, magl-2, . . . , magl-n), and multiple edge enhancement segment thresholds (thrl-1, thrl-2, . . . , thrl-n). Based on the above input data, feature adaptive edge enhancement can be performed on the important feature channel map y_hat_ch to obtain the reconstructed feature map after feature adaptive edge enhancement, where the reconstructed feature map is referred to as the first reconstructed feature Y_hat_sharp. The feature adaptive edge enhancement process is described in Embodiment 10 and will not be repeated here.

In step S35, for the feature adaptive scaling process, the input data includes non-important feature channel maps (the remaining ($C_L-1$) non-important feature channel maps excluding the important feature channel map), non-important probability distribution channel maps (the remaining ($C_L-1$) non-important probability distribution channel maps excluding the important probability distribution channel map), and scaling parameter value ρ. Based on the above input data, feature adaptive scaling can be performed on each non-important feature channel map to obtain a reconstructed feature map after feature adaptive scaling, where the reconstructed feature map is referred to as the second reconstructed feature y_hat_scale. The feature adaptive scaling process is described in Embodiment 11 and will not be repeated here. Where the size of the non-important feature channel map for feature adaptive scaling is $(C_L-1) \times H_L \times W_L$, and the size of the corresponding probability distribution parameter sigma is also $(C_L-1) \times H_L \times W_L$. Each element of this three-dimensional tensor can be scaled using the following adaptive scaling algorithm to obtain the scaled second reconstructed feature.

$$\text{y\_hat\_scale} = \text{y\_hat} + \rho * clip3(\text{sigma} * \text{y\_hat}, -0.5, 0.5).$$

Where clip3 is a value clipping operation.

In step S36, the second reconstructed feature y_hat_scale corresponds to the non-important channel enhancement of the initial reconstructed feature y_hat, and the first reconstructed feature y_hat_sharp corresponds to the important channel enhancement of the initial reconstructed feature y_hat. After merging the first reconstructed feature y_hat_sharp and the second reconstructed feature y_hat_scale, the enhanced reconstructed feature y_hat_enhanced after feature domain enhancement is obtained.

In step S37, the enhanced reconstructed feature y_hat_enhanced after feature domain enhancement is input to the synthesis transform network to obtain the initial reconstructed picture block x_hat. The initial reconstructed picture block x_hat is a two-dimensional tensor with a size of H×W. The important probability distribution channel map sigma_ch of the probability distribution parameter sigma is upsampled to the same size as the initial reconstructed picture block x_hat, and the upsampled probability distribution channel map is denoted as the target probability distribution channel map sigma_ch_upscale.

In step S38, for the picture domain enhancement process, the input data of the picture domain enhancement module includes the initial reconstructed picture block x_hat, the target probability distribution channel map sigma_ch_upscale, multiple picture enhancement segment magnitude values (magy-1, magy-2, . . . , magy-m), and multiple picture enhancement segment thresholds (thry-1, thry-2, . . . , thry-m). Based on the above input data, the picture domain enhancement module can perform picture domain enhancement on the initial reconstructed picture block x_hat to obtain the target reconstructed picture block x_hat_enhanced corresponding to the current picture block x. The picture domain enhancement process is described in Embodiment 12 and will not be repeated here.

Embodiment 15: a coding method is proposed in this embodiment, which may include the following steps S41-S45.

In step S41, based on the $C_1$, feature channel maps y_hat and $C_1$ probability distribution channel maps sigma, the important channel identifier (also referred to as important channel identifier important_channel) corresponding to the important feature channel map is determined.

For example, y_hat and sigma along are sliced along the channel dimension to obtain the current y_hat_ch and sigma_ch, and the bits_per_ch of each feature channel map is calculated using these two tensors, as shown in the following formula. The above process is repeated $C_L$ times to obtain the bits_per_ch of each feature channel map, and the channel number corresponding to the maximum bits_per_ch is selected as the important channel identifier.

$$\text{bits\_per\_ch} = \sum_{1 \le j \le HL} \sum_{1 \le i \le WL} -\log 2\left(\Phi\left(\frac{\text{y\_hat\_ch}(i, j) + 0.5}{\text{sigma\_ch}(i, j)}\right) - \Phi\left(\frac{\text{y\_hat\_ch}(i, j) - 0.5}{\text{sigma\_ch}(i, j)}\right)\right)$$

In step S42, the scaling parameter value p corresponding to the feature adaptive scaling process is determined. For example, N1 candidate scaling parameter value s p are selected, and the enhanced reconstructed feature and target reconstructed picture block x_hat_enhanced corresponding to each candidate scaling parameter value p are obtained, the distortion index value between the target reconstructed picture block x_hat_enhanced and the current picture block x is calculated using the distortion index, and the candidate scaling parameter value p corresponding to the minimum distortion index value is selected as the optimal scaling parameter value p for the feature adaptive scaling process.

In step S43, the feature domain enhancement parameter corresponding to the feature adaptive edge enhancement process is determined, where the feature domain enhancement parameter includes multiple edge enhancement segment magnitude values (magl-1, magl-2, . . . , magl-n) and multiple edge enhancement segment thresholds (thrl-1, thrl-2, . . . , thrl-n). For example, N2 candidate feature domain enhancement parameters are selected, the enhanced reconstructed feature and target reconstructed picture block x_hat_enhanced corresponding to each candidate feature domain enhancement parameter are obtained, the distortion index value between the target reconstructed picture block x_hat_enhanced and the current picture block x is calculated using distortion index, and the candidate feature domain enhancement parameter corresponding to the minimum distortion index value is selected as the optimal feature domain enhancement parameter for the feature adaptive edge enhancement process.

In step S44, the picture domain enhancement parameter corresponding to the picture domain enhancement process is determined, where the picture domain enhancement parameter may include multiple picture enhancement segment magnitude values (magy-1, magy-2, . . . , magy-m) and multiple picture enhancement segment thresholds (thry-1, thry-2, . . . , thry-m). For example, N3 candidate picture domain enhancement parameters are selected, and the enhancement reconstructed feature and target reconstructed picture block x_hat_enhanced corresponding to each candidate picture domain enhancement parameter are obtained, the distortion index value between the target reconstructed picture block x_hat_enhanced and the current picture block x is calculated using the distortion index, and the candidate picture domain enhancement parameter corresponding to the minimum distortion index value is selected as the optimal picture domain enhancement parameter for the picture domain enhancement process.

In step S45, the important channel identifier corresponding to the important feature channel map, the optimal scaling parameter value ρ, the optimal feature domain enhancement parameter, and the optimal picture domain enhancement parameter are encoded into the header information bitstream (the third bitstream Bitstream #3 corresponding to the current picture block). It should be noted that the feature domain enhancement module and the picture domain enhancement module will not change Bitstream #1 and Bitstream #2, but both the encoding and decoding ends will go through the enhancement module when reconstructing the picture, so the reconstructed picture will remain consistent at the encoding and decoding ends.

Embodiment 16: a method for picture adaptive edge enhancement is proposed, in which the process of the picture domain enhancement module performing picture domain enhancement on the initial reconstructed picture block x_hat to obtain the target reconstructed picture block x_hat_enhanced can be a non-edge-enhancement-mask edge enhancement algorithm, namely the Unsharp Masking (USM) edge enhancement algorithm, which includes steps S51 to S54.

In step S51, a two-dimensional convolution operation between the original reconstructed picture and the Gaussian blur convolution kernel is performed to obtain a Gaussian blur picture.

In step S52, the Gaussian blur picture is subtracted from the original reconstructed picture to obtain a high-frequency detail picture.

In step S53, the high-frequency detail picture is multiplied by an edge enhancement coefficient (i.e., the picture enhancement segment magnitude value corresponding to the probability distribution value corresponding to the feature value), and then the original reconstructed picture is added to obtain the final edge enhanced picture.

In step S54, the edge enhanced picture is clipped to the value range of the picture.

For example, the original reconstructed picture is the initial reconstructed picture block x_hat. After clipping the edge enhanced picture to the value range of the picture, the target reconstructed picture block x_hat can be obtained. This process can be referred to in Embodiment 12.

Embodiment 17: a method for feature adaptive edge enhancement is proposed, in which the process of the feature domain enhancement module performing feature adaptive edge enhancement on the important feature channel map based on the feature domain enhancement parameter and the important probability distribution channel map to obtain the first reconstructed feature can include a non-edge-enhancement-mask edge enhancement algorithm, namely the USM (Unsharp Masking) edge enhancement algorithm, which includes steps S61 to S68.

In step S61, the mean is subtracted from the important feature channel map y_hat_ch and then it is divided by the standard deviation to obtain the normalized feature map.

In step S62, the normalized feature map is multiplied by 0.1 and then 0.5 is added, and the feature value is limited to between 0 and 1.

In step S63, a two-dimensional convolution operation between the normalized feature map and the Gaussian blur convolution kernel is performed to obtain a Gaussian blur picture.

In step S64, the Gaussian blur picture is subtracted from the original reconstructed picture to obtain a high-frequency detail picture.

In step S65, the high-frequency detail picture is multiplied by an edge enhancement coefficient (i.e., the edge enhancement segment magnitude value corresponding to the probability distribution value of the feature value), and the result is added to the normalized feature map to obtain the edge enhanced feature map.

In step S66, the feature value of the edge enhanced feature map is limited to between 0 and 1.

In step S67, 0.5 is subtracted from the edge enhanced feature map and the result is divided by 0.1 to obtain the edge enhanced normalized feature map.

In step S68, the edge enhanced normalized feature map is multiplied by the standard deviation and the result is added by the mean to obtain the important feature channel edge enhanced feature map y_hat_sharp (i.e., the first reconstructed feature) corresponding to the important feature channel map y_hat_ch.

For example, the original reconstructed picture is the important feature channel map y_hat_ch, which can be referred to in Embodiment 10.

For example, the above embodiments can be implemented separately or in combination. For example, each of embodiments 1-17 can be implemented separately, and at least two of embodiments 1-17 can be implemented in combination.

For example, in the above embodiments, the content of the encoder can also be applied to the decoder, that is, the decoder can process in the same way with the encoder, and the content of the decoder can also be applied to the encoder, that is, the encoder can process in the same way with the decoder.

Based on the same application concept as the above method, the embodiments of the present disclosure further provide a decoding device. The device is applied to the decoder. The device includes: one or more memories configured to store video data; and a decoder configured to implement the decoding method in embodiments 1-17, namely the processing flow of the decoder.

For example, in an implementation, a decoder is configured to decode the first bitstream corresponding to the current picture block to obtain the coefficient hyperparameter feature corresponding to the current picture block; determine the probability distribution parameter based on the coefficient hyperparameter feature; decode the second bitstream corresponding to the current picture block based on the probability distribution parameter, to obtain the initial reconstructed feature corresponding to the current picture block; decode the third bitstream corresponding to the current picture block to obtain the enhancement parameter corresponding to the current picture block; and based on the enhancement parameter and probability distribution parameter, enhance the initial reconstructed feature to obtain enhanced reconstructed feature, and determine the target reconstructed picture block corresponding to the current picture block based on the enhanced reconstructed feature.

Based on the same application concept as the above method, the embodiments of the present disclosure further provide an encoding device. The device is applied to the encoder. The device includes: one or more memories configured to store video data; and an encoder configured to implement the encoding method in embodiments 1-17, namely the processing flow of the encoder.

For example, in an implementation, an encoder is configured to: encode the coefficient hyperparameter feature corresponding to the current picture block to obtain the first bitstream corresponding to the current picture block; determine probability distribution parameter based on the coefficient hyperparameter feature; encode the initial picture feature corresponding to the current picture block based on the probability distribution parameter, to obtain the second bitstream corresponding to the current picture block; for each candidate enhancement parameter, enhance the initial reconstructed feature based on the candidate enhancement parameter and the probability distribution parameter to obtain enhanced reconstructed feature; determine the target reconstructed picture block based on the enhanced reconstructed feature; determine the cost value corresponding to the candidate enhancement parameter based on the target reconstructed picture block; based on the cost value corresponding to each candidate enhancement parameter, select the enhancement parameter corresponding to the current picture block from all candidate enhancement parameter; and encode the enhancement parameter, to obtain the third bitstream corresponding to the current picture block.

Figure 7A:
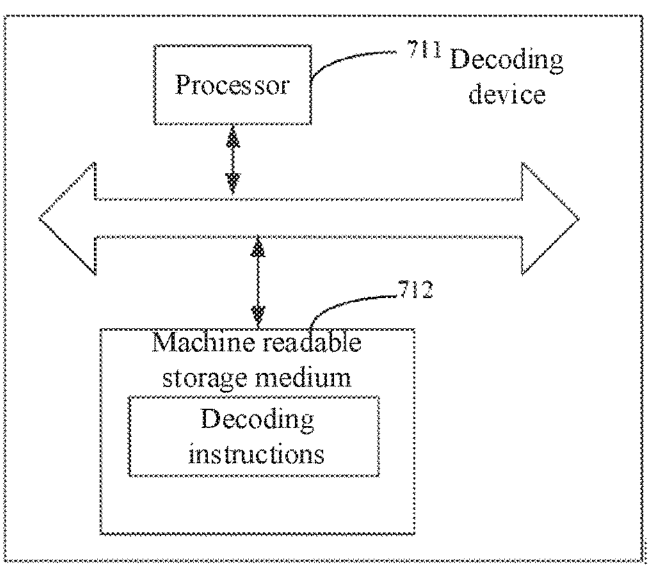
FIG. 7A is a hardware structure diagram of a decoding device according to an embodiment of the present disclosure.

Based on the same application concept as the above method, this embodiment provides a decoding device (also referred to as a video decoder). From a hardware perspective, the hardware architecture diagram of the decoding device can be seen in FIG. 7A. The decoding device includes processor 711 and machine-readable storage medium 712, where machine-readable storage medium 712 stores machine executable instructions that can be executed by processor 711. Processor 711 is configured to execute machine executable instructions to implement the decoding methods of embodiments 1-17 in the present disclosure.

For example, in an implementation, processor 711 executes machine executable instructions to: decode the first bitstream corresponding to the current picture block to obtain the coefficient hyperparameter feature corresponding to the current picture block; determine the probability distribution parameter based on the coefficient hyperparameter feature; decode the second bitstream corresponding to the current picture block based on the probability distribution parameter, to obtain the initial reconstructed feature corresponding to the current picture block; decode the third bitstream corresponding to the current picture block to obtain the enhancement parameter corresponding to the current picture block; and based on the enhancement parameter and probability distribution parameter, enhance the initial reconstructed feature to obtain enhanced reconstructed feature, and determine the target reconstructed picture block corresponding to the current picture block based on the enhanced reconstructed feature.

Figure 7B:
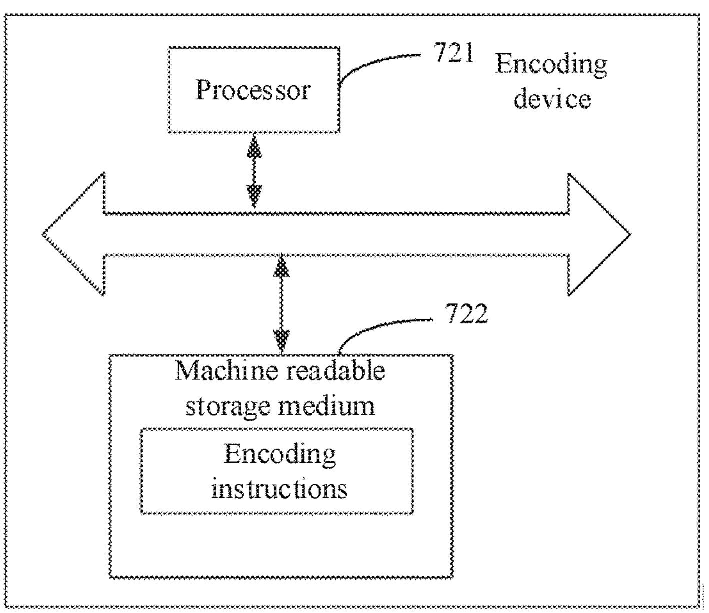
FIG. 7B is a hardware structure diagram of an encoding device according to an embodiment of the present disclosure.

Based on the same application concept as the above method, the embodiment provides an encoding device (also referred to as a video encoder). From a hardware perspective, the hardware architecture diagram of the encoding device can be seen in FIG. 7B. The encoding device includes processor 721 and machine-readable storage medium 722, where machine-readable storage medium 722 stores machine executable instructions that can be executed by processor 721. The processor 721 is configured to execute machine executable instructions to implement the encoding methods of embodiments 1-17 in the present disclosure.

For example, in an implementation, processor 721 executes machine executable instructions to: encode the coefficient hyperparameter feature corresponding to the current picture block to obtain the first bitstream corresponding to the current picture block; determine probability distribution parameter based on the coefficient hyperparameter feature; encode the initial picture feature corresponding to the current picture block based on the probability distribution parameter, to obtain the second bitstream corresponding to the current picture block; for each candidate enhancement parameter, enhance the initial reconstructed feature based on the candidate enhancement parameter and the probability distribution parameter to obtain enhanced reconstructed feature; determine the target reconstructed picture block based on the enhanced reconstructed feature; determine the cost value corresponding to the candidate enhancement parameter based on the target reconstructed picture block; based on the cost value corresponding to each candidate enhancement parameter, select the enhancement parameter corresponding to the current picture block from all candidate enhancement parameter; and encode the enhancement parameter, to obtain the third bitstream corresponding to the current picture block.

Based on the same application concept as the above method, embodiments of the present disclosure provide an electronic device including: a processor and a machine-readable storage medium, where the machine-readable storage medium stores machine executable instructions that can be executed by the processor; the processor is used to execute machine executable instructions to implement the decoding or encoding any one of the methods of embodiments 1-17 of the present disclosure.

Based on the same application concept as the above methods, the embodiments of the present disclosure further provide a machine-readable storage medium, which stores several computer instructions. When the computer instructions are executed by a processor, the methods in the embodiments of the present disclosure can be implemented, such as the decoding methods or encoding methods in the above embodiments.

Based on the same application concept as the above method, the embodiments of the present disclosure also provide a computer application program that, when executed by a processor, can implement the decoding method or encoding method disclosed in the above embodiments of the present disclosure.

Based on the same application concept as the above method, embodiments of the present disclosure further propose a decoding apparatus, which can be applied to the decoding device (also referred to as a video decoder). The decoding apparatus may include: a decoding module, configured to decode the first bitstream corresponding to the current picture block, to obtain the coefficient hyperparameter feature corresponding to the current picture block; determine probability distribution parameter based on the coefficient hyperparameter feature, decode the second bitstream corresponding to the current picture block based on the probability distribution parameter, to obtain the initial reconstructed feature corresponding to the current picture block; decoding the third bitstream corresponding to the current picture block to obtain the enhancement parameter corresponding to the current picture block; an enhancement module, configured to enhance the initial reconstructed feature based on the enhancement parameter and probability distribution parameter, to obtain enhanced reconstructed feature; and a determining module, configured to determine the target reconstructed picture block corresponding to the current picture block based on the enhanced reconstructed feature.

For example, the enhancement parameter include important channel identifier, the initial reconstructed feature includes C feature channel maps, the probability distribution parameter includes C probability distribution channel maps, the C probability distribution channel maps respectively correspond to the C feature channel maps, and the enhancement module is further used to select the feature channel map corresponding to the important channel identifier from the C feature channel maps as the important feature channel map, and select the remaining feature channel maps as non-important feature channel maps; select the probability distribution channel map corresponding to the important feature channel map as the important probability distribution channel map, and select the probability distribution channel map corresponding to the non-important feature channel map as the non-important probability distribution channel map.

For example, the initial reconstructed feature includes C feature channel maps, the probability distribution parameter includes C probability distribution channel maps, and the C probability distribution channel maps respectively correspond to the C feature channel maps. The enhancement module is further configured to determine the number of consumed bits for each feature channel map based on the feature values in the feature channel map and the probability distribution values in the probability distribution channel map corresponding to the feature channel map for each feature channel map; based on the number of consumed bits for each feature channel map, select important feature channel maps from the C feature channel maps, and select the remaining feature channel maps as non-important feature channel maps; select the probability distribution channel map corresponding to the important feature channel map as the important probability distribution channel map, and select the probability distribution channel map corresponding to the non-important feature channel map as the non-important probability distribution channel map.

For example, the initial reconstructed feature includes important feature channel maps and non-important feature channel maps, and the probability distribution parameter includes important probability distribution channel maps corresponding to the important feature channel maps and non-important probability distribution channel maps corresponding to the non-important feature channel maps. When enhancing the initial reconstructed feature based on the enhancement parameter and probability distribution parameter, to obtain the enhanced reconstructed feature, the enhancement module is configured to implement: performing feature adaptive edge enhancement on the important feature channel map based on the feature domain enhancement parameter and the important probability distribution channel map to obtain the first reconstructed feature after the feature adaptive edge enhancement; based on the feature domain enhancement parameter and the non-important probability distribution channel map, performing feature adaptive scaling on the non-important feature channel map to obtain the second reconstructed feature after the feature adaptive scaling; and generating the enhanced reconstructed feature based on the first reconstructed feature and second reconstructed feature.

For example, the feature domain enhancement parameter includes multiple edge enhancement segment magnitude values and multiple edge enhancement segment thresholds. The multiple edge enhancement segment thresholds form multiple edge enhancement threshold intervals, and the multiple edge enhancement threshold intervals respectively correspond to the multiple edge enhancement segment magnitude values; when performing feature adaptive edge enhancement on the important feature channel map based on the feature domain enhancement parameter and the important probability distribution channel map, to obtain the first reconstructed feature after feature adaptive edge enhancement, the enhancement module is configured to implement: when the important probability distribution channel map includes multiple probability distribution values, for each probability distribution value, determining the edge enhancement segment magnitude value corresponding to the probability distribution value based on the edge enhancement threshold interval corresponding to the probability distribution value; and based on the edge enhancement segment magnitude value corresponding to each probability distribution value, performing feature adaptive edge enhancement on the important feature channel map to obtain the first reconstructed feature after feature adaptive edge enhancement.

For example, when performing feature adaptive edge enhancement on the important feature channel map based on the edge enhancement segment magnitude value corresponding to each probability distribution value, to obtain the first reconstructed feature after feature adaptive edge enhancement, the enhancement module is configured to implement: normalizing the important feature channel map to obtain a normalized feature map; generating a high-frequency detail picture based on the important feature channel map and the normalized feature map; for each feature value in high-frequency detail picture, based on the edge enhancement segment magnitude value corresponding to the probability distribution value corresponding to the feature value, performing edge enhancement on the feature value to obtain the edge enhanced feature value; determining the edge enhanced feature map based on the edge enhanced feature value corresponding to each feature value; and performing inverse normalization on the edge enhanced feature map to obtain the first reconstructed feature.

For example, the feature domain enhancement parameter includes scaling parameter value, and when performing feature adaptive scaling on the non-important feature channel map based on the feature domain enhancement parameter and the non-important probability distribution channel map to obtain the second reconstructed feature after feature adaptive scaling, the enhancement module is configured for: when the non-important feature channel map includes multiple feature values, and the non-important probability distribution channel map includes multiple probability distribution values, for each feature value in the non-important feature channel map, determining the scaled feature value corresponding to the feature value based on the feature value, the scaling parameter value, and the probability distribution value corresponding to the feature value; and based on the scaled feature value corresponding to each feature value in the non-important feature channel map, determining the second reconstructed feature.

For example, when determining the target reconstructed picture block corresponding to the current picture block based on the enhanced reconstructed feature, the determining module is specifically configured to: input the enhanced reconstructed feature into a synthesis transform network to obtain the target reconstructed picture block corresponding to the current picture block; or input the enhanced reconstructed feature into a synthesis transform network to obtain the initial reconstructed picture block corresponding to the current picture block; and based on the picture domain enhancement parameter corresponding to the current picture block and the probability distribution parameter, perform picture adaptive edge enhancement on the initial reconstructed picture block to obtain the target reconstructed picture block corresponding to the current picture block; where the picture domain enhancement parameter are obtained by decoding the third bitstream corresponding to the current picture block.

For example, the picture domain enhancement parameter include multiple picture enhancement segment magnitude values and multiple picture enhancement segment thresholds. The multiple picture enhancement segment thresholds form multiple picture enhancement threshold intervals, which respectively correspond to the multiple picture enhancement segment magnitude values. When performing picture adaptive edge enhancement on the initial reconstructed picture block based on the picture domain enhancement parameter corresponding to the current picture block and the probability distribution parameter, to obtain the target reconstructed picture block corresponding to the current picture block, the determining module is configured for: obtaining the target probability distribution channel map based on the probability distribution parameter; when the target probability distribution channel map includes multiple probability distribution values, for each probability distribution value, determining the picture enhancement segment magnitude value corresponding to the probability distribution value based on the picture enhancement threshold interval corresponding to that probability distribution value; and based on the picture enhancement segment magnitude value corresponding to each probability distribution value, performing picture adaptive edge enhancement on the initial reconstructed picture block to obtain the target reconstructed picture block corresponding to the current picture block.

For example, when the determining module obtains the target probability distribution channel map based on the probability distribution parameter, the determining module is specifically configured for: if the probability distribution parameter includes an important probability distribution channel map and a non-important probability distribution channel map, upsampling the important probability distribution channel map to obtain the target probability distribution channel map; where the size of the target probability distribution channel map is the same as the size of the initial reconstructed picture block.

For example, when performing picture adaptive edge enhancement on the initial reconstructed picture block based on the picture enhancement segment magnitude value corresponding to each probability distribution value, to obtain the target reconstructed picture block corresponding to the current picture block, the determining module is configured for: generating a high-frequency detail picture based on the initial reconstructed picture block; for each feature value in the high-frequency detail picture, based on the picture enhancement segment magnitude value corresponding to the probability distribution value corresponding to the feature value, performing edge enhancement on the feature value, to obtain the picture enhanced feature value; and determining the target reconstructed picture block based on the picture enhanced feature value corresponding to each feature value in the high-frequency detail picture.

For example, when enhancing the initial reconstructed feature based on the enhancement parameter and probability distribution parameter, to obtain the enhanced reconstructed feature, the enhancement module is configured to: enhance the initial reconstructed feature corresponding to the luma component of the current picture block based on the feature domain enhancement parameter and probability distribution parameter, to obtain the enhanced reconstructed feature corresponding to the luma component. When the determining module performs picture adaptive edge enhancement on the initial reconstructed picture block based on the probability distribution parameter and the picture domain enhancement parameter corresponding to the current picture block, to obtain the target reconstructed picture block corresponding to the current picture block, the determining module is configured for: performing picture adaptive edge enhancement on the initial reconstructed picture block corresponding to the luma component of the current picture block based on the picture domain enhancement parameter and probability distribution parameter to obtain the target reconstructed picture block corresponding to the luma component; and based on picture domain enhancement parameter and probability distribution parameter, performing picture adaptive edge enhancement on the initial reconstructed picture block corresponding to the chroma component of the current picture block to obtain the target reconstructed picture block corresponding to the chroma component.

For example, the initial reconstructed feature includes multiple feature channel maps, the probability distribution parameter includes multiple probability distribution channel maps, the multiple probability distribution channel maps respectively correspond to the multiple feature channel maps, and the decoding module is configured for: decoding a bitstream corresponding to the current picture block to obtain an important channel identifier; and the determining module is configured for: based on the important channel identifier, selecting the feature channel map corresponding to the important channel identifier from the multiple feature channel maps as the important feature channel map, and selecting the remaining feature channel maps as non-important feature channel maps; and selecting the probability distribution channel map corresponding to the important feature channel map as the important probability distribution channel map, and selecting the probability distribution channel maps corresponding to the non-important feature channel maps as the non-important probability distribution channel maps.

For example, the initial reconstructed feature includes multiple feature channel maps, the probability distribution parameter includes multiple probability distribution channel maps, the multiple probability distribution channel maps respectively correspond to the multiple feature channel maps, and the determining module is configured for: for each feature channel map, based on the feature values in the feature channel map and the probability distribution values in the probability distribution channel map corresponding to the feature channel map, determining the number of consumed bits for the feature channel map; based on the number of consumed bits for each feature channel map, selecting an important feature channel map from the multiple feature channel maps, and selecting the remaining feature channel maps as non-important feature channel maps; and selecting the probability distribution channel map corresponding to the important feature channel map as the important probability distribution channel map, and selecting the probability distribution channel maps corresponding to the non-important feature channel maps as the non-important probability distribution channel maps.

For example, by decoding the first bitstream corresponding to the current picture block, the coefficient hyperparameter feature and probability distribution parameter corresponding to the current picture block are obtained; by decoding the second bitstream corresponding to the current picture block, the initial reconstructed feature corresponding to the current picture block is obtained; and by decoding the third bitstream corresponding to the current picture block, the important channel identifier is obtained; where the first bitstream, the second bitstream, and the third bitstream are bitstreams encoding different information.

Based on the same application concept as the above method, embodiments of the present disclosure further propose an encoding apparatus, which is applied to the encoder (also referred to as a video encoder). The apparatus may include: an encoding module configured to: encode the coefficient hyperparameter feature corresponding to the current picture block to obtain the first bitstream corresponding to the current picture block; determine probability distribution parameter based on the coefficient hyperparameter feature; encode the initial picture feature corresponding to the current picture block based on the probability distribution parameter, to obtain the second bitstream corresponding to the current picture block; an enhancement module configured to: for each candidate enhancement parameter, enhance the initial reconstructed feature based on the candidate enhancement parameter and the probability distribution parameter to obtain enhanced reconstructed feature; a determining module configured to: determine the target reconstructed picture block based on the enhanced reconstructed feature; determine the cost value corresponding to the candidate enhancement parameter based on the target reconstructed picture block; based on the cost value corresponding to each candidate enhancement parameter, select the enhancement parameter corresponding to the current picture block from all candidate enhancement parameter; and an encoding module configured to encode the enhancement parameter, to obtain the third bitstream corresponding to the current picture block.

For example, the initial reconstructed feature includes important feature channel maps and non-important feature channel maps, and the probability distribution parameter includes important probability distribution channel maps corresponding to the important feature channel maps and non-important probability distribution channel maps corresponding to the non-important feature channel maps. When enhancing the initial reconstructed feature based on the candidate enhancement parameter and probability distribution parameter, to obtain the enhanced reconstructed feature, the enhancement module is configured to implement: performing feature adaptive edge enhancement on the important feature channel map based on the candidate feature domain enhancement parameter and the important probability distribution channel map to obtain the first reconstructed feature after the feature adaptive edge enhancement; based on the candidate feature domain enhancement parameter and the non-important probability distribution channel map, performing feature adaptive scaling on the non-important feature channel map to obtain the second reconstructed feature after the feature adaptive scaling; and generating the enhanced reconstructed feature based on the first reconstructed feature and second reconstructed feature.

For example, when the determining module determines the target reconstructed picture block based on the enhanced reconstructed feature, the determining module is configured for: inputting the enhanced reconstructed feature into a synthesis transform network to obtain the initial reconstructed picture block corresponding to the current picture block; for each candidate picture domain enhancement parameter, performing picture adaptive edge enhancement on the initial reconstructed picture block based on the candidate picture domain enhancement parameter and probability distribution parameter to obtain the target reconstructed picture block corresponding to the current picture block;

the encoding module is configured for: for each candidate picture domain enhancement parameter, determining the cost value corresponding to the candidate picture domain enhancement parameter based on the target reconstructed picture block; based on the cost value corresponding to each candidate picture domain enhancement parameter, selecting the picture domain enhancement parameter corresponding to the current picture block from all candidate picture domain enhancement parameter, and encoding the picture domain enhancement parameter to obtain the third bitstream corresponding to the current picture block.

Those skilled in the art should understand that embodiments of the present disclosure can be provided as methods, systems, or computer program products. Accordingly, the present disclosure may take the form of an entirely hardware embodiment, an entirely software embodiment, or an embodiment combining software and hardware aspects. Furthermore, the embodiments of the present disclosure may employ the form of a computer program product implemented on one or more computer-usable storage media (including, but not limited to, disk storage, CD-ROM, optical storage, etc.), where the one or more computer-usable storage media having computer-usable program code. The above description is only embodiments of the present disclosure and is not intended to limit the present disclosure.

For those skilled in the art, various modifications and changes may be made in the present disclosure. Any modification, equivalent replacement, improvement, etc. present the spirit and principle of the present disclosure shall be included in the scope of the claims of the present disclosure.

The invention claimed is:

1. A decoding method, comprising:

decoding a bitstream corresponding to a current picture block to obtain a coefficient hyperparameter feature corresponding to the current picture block;

determining a probability distribution parameter based on the coefficient hyperparameter feature;

based on the probability distribution parameter, decoding a bitstream corresponding to the current picture block to obtain an initial reconstructed feature of the current picture block; and determining a target reconstructed picture block corresponding to the current picture block based on the initial reconstructed feature, wherein determining the target reconstructed picture block corresponding to the current picture block based on the initial reconstructed feature comprises:

inputting the initial reconstructed feature into a synthesis transform network to obtain an initial reconstructed picture block corresponding to the current picture block; and based on the probability distribution parameter and a picture domain enhancement parameter corresponding to the current picture block, performing picture adaptive edge enhancement on the initial reconstructed picture block to obtain the target reconstructed picture block corresponding to the current picture block, wherein the picture domain enhancement parameter is obtained by decoding a bitstream corresponding to the current picture block.

2. The method according to claim 1, wherein determining the target reconstructed picture block corresponding to the current picture block based on the initial reconstructed feature comprises:

inputting the initial reconstructed feature into a synthesis transform network to obtain the target reconstructed picture block corresponding to the current picture block.

3. The method according to claim 1, wherein the picture domain enhancement parameter comprises picture enhancement segment magnitude values and picture enhancement segment thresholds, wherein the picture enhancement segment thresholds form picture enhancement threshold intervals, and the picture enhancement threshold intervals respectively correspond to the picture enhancement segment magnitude values.

4. The method according to claim 3, wherein based on the probability distribution parameter and the picture domain enhancement parameter corresponding to the current picture block, performing picture adaptive edge enhancement on the initial reconstructed picture block to obtain the target reconstructed picture block corresponding to the current picture block comprising:

obtaining a target probability distribution channel map based on the probability distribution parameter;

when the target probability distribution channel map comprises a plurality of probability distribution values, for each of the plurality of probability distribution values, determining the picture enhancement segment magnitude value corresponding to the probability distribution value based on the picture enhancement threshold interval corresponding to the probability distribution value; and based on the picture enhancement segment magnitude value corresponding to each of the plurality of probability distribution values, performing picture adaptive edge enhancement on the initial reconstructed picture block to obtain the target reconstructed picture block corresponding to the current picture block.

5. The method according to claim 4, wherein obtaining the target probability distribution channel map based on the probability distribution parameter comprises:

when the probability distribution parameter comprises an important probability distribution channel map and a non-important probability distribution channel map, upsampling the important probability distribution channel map to obtain the target probability distribution channel map;

wherein a size of the target probability distribution channel map is same as a size of the initial reconstructed picture block.

6. The method according to claim 4, wherein based on the picture enhancement segment magnitude value corresponding to each of the plurality of probability distribution values, performing picture adaptive edge enhancement on the initial reconstructed picture block to obtain the target reconstructed picture block corresponding to the current picture block comprises:

generating a high-frequency detail picture based on the initial reconstructed picture block;

for each feature value in the high-frequency detail picture, based on the picture enhancement segment magnitude value corresponding to the probability distribution value corresponding to the feature value, performing edge enhancement on the feature value, to obtain a picture enhanced feature value; and determining the target reconstructed picture block based on the picture enhanced feature value corresponding to each feature value in the high-frequency detail picture.

7. The method according to claim 1, wherein based on the probability distribution parameter and the picture domain enhancement parameter corresponding to the current picture block, performing picture adaptive edge enhancement on the initial reconstructed picture block to obtain the target reconstructed picture block corresponding to the current picture block comprising:

based on the picture domain enhancement parameter and the probability distribution parameter, performing picture adaptive edge enhancement on an initial reconstructed picture block corresponding to a luma component of the current picture block, to obtain a target reconstructed picture block corresponding to the luma component.

8. The method according to claim 5, wherein the initial reconstructed feature comprises a plurality of feature channel maps, the probability distribution parameter comprises a plurality of probability distribution channel maps, the plurality of probability distribution channel maps respectively correspond to the plurality of feature channel maps, and the method further comprises:

decoding a bitstream corresponding to the current picture block to obtain an important channel identifier;

based on the important channel identifier, selecting a feature channel map corresponding to the important channel identifier from the plurality of feature channel maps as an important feature channel map, and selecting remaining feature channel maps as non-important feature channel maps; and selecting a probability distribution channel map corresponding to the important feature channel map as the important probability distribution channel map, and selecting probability distribution channel maps corresponding to the non-important feature channel maps as the non-important probability distribution channel maps.

9. The method according to claim 5, wherein the initial reconstructed feature comprises a plurality of feature channel maps, the probability distribution parameter comprises a plurality of probability distribution channel maps, the plurality of probability distribution channel maps respectively correspond to the plurality of feature channel maps, and the method further comprises:

for each of the plurality of feature channel maps, based on feature values in the feature channel map and probability distribution values in the probability distribution channel map corresponding to the feature channel map, determining a number of consumed bits for the feature channel map;

based on the number of consumed bits for each of the plurality of feature channel maps, selecting an important feature channel map from the plurality of feature channel maps, and selecting remaining feature channel maps as non-important feature channel maps; and selecting a probability distribution channel map corresponding to the important feature channel map as the important probability distribution channel map, and selecting probability distribution channel maps corresponding to the non-important feature channel maps as the non-important probability distribution channel maps.

10. The method according to claim 8, wherein the probability distribution parameter and the coefficient hyperparameter feature corresponding to the current picture block are obtained by decoding a first bitstream corresponding to the current picture block;

by decoding a second bitstream corresponding to the current picture block, obtaining the initial reconstructed feature corresponding to the current picture block; and by decoding a third bitstream corresponding to the current picture block, obtaining the important channel identifier;

wherein the first bitstream, the second bitstream, and the third bitstream are bitstreams encoding different information.

11. The method according to claim 10, wherein the third bitstream is a header information bitstream.

12. An encoding method, comprising:

encoding a coefficient hyperparameter feature corresponding to a current picture block to obtain a first bitstream corresponding to the current picture block;

determining a probability distribution parameter based on the coefficient hyperparameter feature;

encoding an initial picture feature corresponding to the current picture block based on the probability distribution parameter, to obtain a second bitstream corresponding to the current picture block; and encoding an important channel identifier to obtain a third bitstream corresponding to the current picture block, wherein encoding the important channel identifier to obtain the third bitstream corresponding to the current picture block comprises:

encoding a picture domain enhancement parameter to obtain the third bitstream, wherein the picture domain enhancement parameter is configured to perform, by a decoder, picture adaptive edge enhancement on an initial reconstructed picture block based on the picture domain enhancement parameter and the probability distribution parameter to obtain a target reconstructed picture block corresponding to the current picture block.

13. A decoding device, comprising:

one or more processors; and one or more machine-readable storage media, wherein the one or more machine-readable storage media store machine executable instructions that can be executed by the one or more processors, wherein the one or more processors are configured to execute the machine executable instructions to perform operations comprising:

decoding a bitstream corresponding to a current picture block to obtain a coefficient hyperparameter feature corresponding to the current picture block;

determining a probability distribution parameter based on the coefficient hyperparameter feature;

based on the probability distribution parameter, decoding a bitstream corresponding to the current picture block to obtain an initial reconstructed feature of the current picture block; and determining a target reconstructed picture block corresponding to the current picture block based on the initial reconstructed feature, wherein determining the target reconstructed picture block corresponding to the current picture block based on the initial reconstructed feature comprises:

inputting the initial reconstructed feature into a synthesis transform network to obtain an initial reconstructed picture block corresponding to the current picture block; and based on the probability distribution parameter and a picture domain enhancement parameter corresponding to the current picture block, performing picture adaptive edge enhancement on the initial reconstructed picture block to obtain the target reconstructed picture block corresponding to the current picture block, wherein the picture domain enhancement parameter is obtained by decoding a bitstream corresponding to the current picture block.

14. An encoder device, comprising:

one or more processors; and one or more machine-readable storage media, wherein the one or more machine-readable storage media store machine executable instructions that can be executed by the one or more processors; and the one or more processors are configured to execute the machine executable instructions to implement the method according to claim 12.

15. A non-transitory machine readable storage medium, wherein the non-transitory machine readable storage medium stores computer instructions that are executable by one or more processors to implement the method according to claim 1.

16. A non-transitory machine readable storage medium, wherein the machine readable storage medium stores computer instructions, and one or more processors execute the computer instructions to implement the method according to claim 12.

* * * * *